United States Patent
Vasilescu et al.

(10) Patent No.: US 10,661,987 B2
(45) Date of Patent: May 26, 2020

(54) BIN TIPPER FOR LIFTING A COLLECTION BIN AND DEPOSITING MATERIAL CONTAINED IN THE COLLECTION BIN

(71) Applicant: Shred-Tech Corporation, Cambridge (CA)

(72) Inventors: Constantin Vasilescu, Cambridge (CA); Paul Hachkowski, Ontario (CA)

(73) Assignee: SHRED-TECH CORPORATION, Cambridge, Ontario (CA)

( * ) Notice: Subject to any disclaimer, the term of this patent is extended or adjusted under 35 U.S.C. 154(b) by 162 days.

(21) Appl. No.: 15/910,944

(22) Filed: Mar. 2, 2018

(65) Prior Publication Data

US 2018/0251297 A1    Sep. 6, 2018

Related U.S. Application Data

(60) Provisional application No. 62/466,786, filed on Mar. 3, 2017, provisional application No. 62/609,988, filed on Dec. 22, 2017.

(51) Int. Cl.
| | |
|---|---|
| *B65F 3/08* | (2006.01) |
| *B65G 65/23* | (2006.01) |
| *B66F 3/08* | (2006.01) |
| *B65G 69/00* | (2006.01) |

(Continued)

(52) U.S. Cl.
CPC .................. *B65F 3/08* (2013.01); *B60P 1/00* (2013.01); *B60P 1/48* (2013.01); *B65G 65/23* (2013.01); *B65G 69/00* (2013.01); *B66F 3/08* (2013.01); *B02C 18/0092* (2013.01); *B65F 2003/008* (2013.01); *B65F 2003/023* (2013.01);

(Continued)

(58) Field of Classification Search
CPC ...... G65F 3/08; G65G 65/23; G66F 2003/023
See application file for complete search history.

(56) References Cited

U.S. PATENT DOCUMENTS

| | | | | | |
|---|---|---|---|---|---|
| 1,763,499 | A | * | 6/1930 | Bolger | B65F 3/08 414/409 |
| 3,136,436 | A | * | 6/1964 | Erlinder | B60P 1/48 414/409 |

(Continued)

OTHER PUBLICATIONS

MDS-3 Promo Video from https://www.youtube.com/watch?v=aShVCtSpTuY, dated May 26, 2016 (Year: 2016).*

*Primary Examiner* — Mark C Hageman
(74) *Attorney, Agent, or Firm* — Brinks Gilson & Lione

(57) ABSTRACT

A bin tipper includes a vertical support column, a cam track adjacent to the vertical support column, a structural member mounted to and configured to translate along the vertical support column, and a gripper assembly including a gripper mount having gripper arms mounted thereon that are configured to receive and hold a collection bin. The cam track includes a proximal portion parallel to the vertical support column and a distal portion provided at an angle with respect to the vertical support column. A first end of the gripper mount is pivotally mounted to the structural member and a second end of the gripper mount includes a cam follower extending therefrom that is configured to move within the proximal and distal portions of the cam track. The gripper assembly lifts and inverts the collection bin based on a position of the cam follower of the gripper mount within the cam track.

18 Claims, 24 Drawing Sheets

(51) Int. Cl.
  *B60P 1/00* (2006.01)
  *B60P 1/48* (2006.01)
  *B02C 18/00* (2006.01)
  *B65F 3/02* (2006.01)
  *B65F 3/00* (2006.01)

(52) U.S. Cl.
  CPC . *B65F 2003/025* (2013.01); *B65F 2003/0296* (2013.01); *B66F 2700/04* (2013.01)

(56) References Cited

U.S. PATENT DOCUMENTS

| | | | |
|---|---|---|---|
| 3,942,663 A * | 3/1976 | Wentzel | B66F 9/02 414/420 |
| 4,597,710 A * | 7/1986 | Kovats | B65F 3/08 187/302 |
| 4,978,268 A * | 12/1990 | Winwood | B65F 3/08 414/409 |
| 5,071,303 A * | 12/1991 | Carson | B65F 1/006 414/21 |
| 5,505,576 A * | 4/1996 | Sizemore | B65F 3/08 414/408 |
| 6,588,691 B2 | 7/2003 | Yamamoto et al. | |
| 7,891,592 B2 | 2/2011 | Yamamoto et al. | |
| 8,517,294 B2 | 8/2013 | Yamamoto et al. | |
| 9,028,192 B2 * | 5/2015 | Wahls | B65F 1/1452 414/408 |
| 9,126,755 B2 * | 9/2015 | Walter | B65F 1/1452 |
| 2006/0219826 A1 | 10/2006 | Yamamoto | |
| 2013/0259614 A1 * | 10/2013 | Vasilescu | B65F 3/14 414/406 |
| 2014/0166789 A1 | 6/2014 | Yamamoto et al. | |
| 2018/0118459 A1 * | 5/2018 | Koenig | B61D 3/188 |

\* cited by examiner

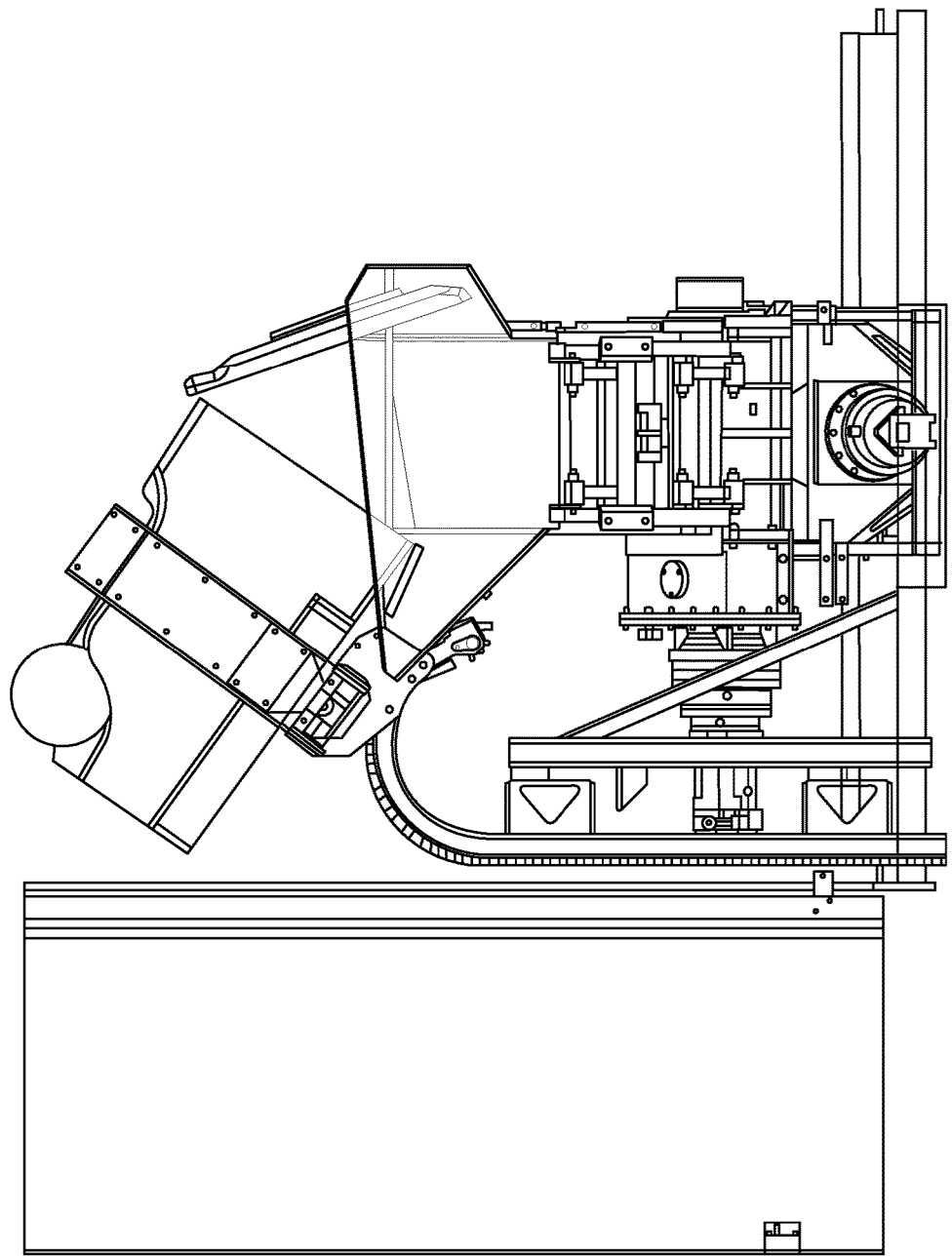

BIN TIPPER FOR LIFTING A COLLECTION BIN AND DEPOSITING MATERIAL CONTAINED IN THE COLLECTION BIN

CROSS-REFERENCE TO RELATED APPLICATIONS

This application claims the benefit under 35 U.S.C. § 119(e) of U.S. Provisional Application No. 62/466,786, filed on Mar. 3, 2017, and U.S. Provisional Application No. 62/609,988, filed on Dec. 22, 2017, the contents of which are hereby incorporated by reference in their entireties into the present disclosure.

BACKGROUND

Field of Embodiments

The disclosed embodiments relate generally to an apparatus and methods for loading material. In particular, the embodiments relate to a bin tipper for lifting a collection bin and depositing material contained in the collection bin.

Description of Related Art

Material is often loaded into motor vehicles to be transported to other locations, for example, for delivery, recycling or destruction. It is known to have mobile collection systems with a bin tunnel and a bin tipper to load the content of a bin into a truck box of a truck. Where the collection bin contains items to be shredded, the truck box can contain a shredder or the truck can simply be a collection vehicle that delivers the contents to another location to be shredded. Where the truck is a collection vehicle, the truck box can include one or more storage areas for storing the deposited contents of the collection bin.

Bin tunnels have a closed position in which an outer wall of the bin tunnel is flush with an outer wall of the truck box. When the truck is being driven, the bin tunnel is in the closed position. When the truck is stopped and it is desired to empty the contents of one or more bins into the truck box, the bin tunnel is pulled outward from the truck box to an open position. The bin tunnel and the collection bin to be emptied are appropriately sized relative to one another so that the collection bin will fit into the bin tunnel when the bin tunnel is in the open position. A bin tipper is mounted on the inner wall of the bin tunnel to lift up the collection bin and turn the collection bin upside down to empty the contents into the truck box. Typically, the bin tipper will lift a material-filled bin to a position over the top of a hopper, a shredder, or a storage area, and subsequently tip the collection bin such that the material falls out of the collection bin and is deposited into the hopper, the shredder, or the storage area.

In order to lift the collection bin, a conventional bin tipper may include a chain, a carriage mounted on the chain, and a hydraulic drive for powering the chain (over a support structure). The carriage includes an engagement mechanism for attaching the collection bin. The engagement mechanism may include two arms, each of the arms configured to close in a direction toward the other arm to grip the collection bin. Each of the arms may be connected to a cylinder configured to actuate the arm. The chain is moveable by means of the hydraulic drive from a lower position, in which the carriage is adjacent to the ground on which the collection bin is standing, up and over an arc to a raised position, in which the carriage is adjacent to an inlet of a location in which the material will be deposited. A problem encountered by conventional clamping arms is the tendency to deform the collection bin due to the fixed shape of the arms and weak material from which the collection bins are made (e.g., plastic). This results in bin failure. Moreover, the arms might not be able to handle a full range or variety of bin sizes and types without add-ons, for example, an insert for gripping smaller sized bins. The arms often have a limited contact area with the collection bin, leading to poor gripping efficiency as a higher force is required to prevent the collection bin from slipping.

The bin tipper has three functions, namely, gripping the collection bin, lifting the collection bin, and overturning (i.e., tipping) the collection bin. In conventional bin tippers (see FIG. 24), a gripper carriage moves along a cane to lift and tip the collection bin. The cane includes a vertical portion at a proximal end thereof and an arch portion at a distal end thereof. When the gripper carriage moves toward the distal-most end of the arch portion, the collection bin is inverted and its contents are deposited into the hopper, the shredder, or the storage area. A higher pulling force is required to get the collection bin over the arch than is required to lift the collection bin vertically in the vertical portion of the cane. The arch also requires its fixing position to be further from a deposit site (e.g., the hopper, the shredder, or the storage area), thus, increasing the volume, in particular, the depth of any safety enclosures. When the bin tipper is located in a bin tunnel of a motor vehicle, the deep bin tunnel enclosure may encroach upon sidewalks and/or block pedestrian traffic. If the truck box includes a shredder, the arch requires extra installation space in the shredding compartment. The cane geometry, in particular, the downward portion of the arch, induces very high loads on a receiving hopper if the receiving hopper is not completely empty as the carriage approaches the end of travel. In addition, the cane geometry limits the design options for the hopper shape and size, as the hopper must clear the end of the cane and the gripper carriage. If the material load of the hopper is too high, the collection bin will interfere and force the hopper downwards.

In addition, the pressure requirements of the two bin tipper functions are disproportionate. For example, the power requirement to lift a 400 pound bin is high (approximately 11 HP), while the power requirement to grip the 400 pound bin is approximately 6 HP. The difference in the power requirements for the two functions is largely attributed to the lift function involving pulling the chain in tension over a curved arch to tip the collection bin.

A need exists for improved technology, including technology that may address one or more of the above described disadvantages.

SUMMARY

In some embodiments, a bin tipper is configured to lift and invert a collection bin to deposit contents of the collection bin into a desired location. The bin tipper includes a vertical support column, a cam track adjacent to the vertical support column, a structural member mounted to the vertical support column and configured to translate along the vertical support column, and a gripper assembly including a gripper mount having gripper arms mounted thereon. The gripper arms configured to receive and hold the collection bin. The cam track includes a proximal portion parallel to the vertical support column and a distal portion provided at an angle with respect to the vertical support column. A first end of the gripper mount is pivotally mounted to the structural member and a second end of the gripper mount includes a cam follower extending therefrom. The cam follower configured to move within the proximal portion and the distal portion of the cam track. The gripper assembly is configured to lift and invert the collection bin based on a position of the cam follower of the gripper mount within the cam track.

In one aspect, the vertical support column comprises parallel guide rails, and the structural member is mounted to the parallel guide rails and configured to translate along the parallel guide rails.

In one aspect, the bin tipper further includes a plurality of guide bearing blocks, the structural member and the plurality of guide bearing blocks together comprising a lift carriage. Each of the parallel guide rails is received in at least one of the plurality of guide bearing blocks. The structural member is mounted to the parallel guide rails via the plurality of guide bearing blocks. The guide bearing blocks are configured to translate along the parallel guide rails, thereby translating the structural member along the vertical support column.

In one aspect, the bin tipper further includes a lead screw anchored in a first end bearing block at a top portion of the vertical support column at a first end thereof, and anchored in a second end bearing block at a bottom portion of the vertical support column at a second end thereof; at least one lead screw nut anchored to the lift carriage and configured to interface with the lead screw; and a drive motor configured to drive the lead screw to translate the lift carriage along the vertical support column.

In one aspect, the bin tipper does not include a chain.

In one aspect, a maximum width of the structural member is equal to a width of the vertical support column such that the structural member does not overlap with the cam track.

In one aspect, the distal portion of the cam track is provided at a perpendicular angle with respect to the vertical support column.

In one aspect, the gripper mount is pivotally mounted to the structural member via a stub shaft. When the cam follower is located within the proximal portion of the cam track, the cam follower is provided at a height greater than a height at which the stub shaft is provided.

In one aspect, as the cam follower moves along the distal portion of the cam track in a direction extending away from the vertical support column, the gripper mount is configured to pivot with respect to the structural member to invert the collection bin.

In one aspect, the gripper assembly further comprises a gripper weldment attached to the gripper mount; a first gripper arm mounted to the gripper weldment via a first pivot; and a second gripper arm mounted to the gripper weldment via a second pivot.

In one aspect, the gripper assembly further comprises a support platform configured to support a bottom of the collection bin. The support platform is attached to the gripper weldment.

In one aspect, the gripper assembly further comprises a linear actuator configured to extent and retract to reversibly and repeatedly move the second gripper arm inwards or outwards; and a link arm pivotally connected to the first gripper arm and the second gripper arm, the link arm being configured to move the first gripper arm in an opposite rotational direction than the second gripper arm.

In one aspect, the gripper assembly further comprises a first swivel arm mounted to the first gripper arm via a first ball joint; and a second swivel arm mounted to the second gripper arm via a second ball joint. The first swivel arm and the second swivel arm are configured to receive the collection bin therebetween.

In one aspect, the first swivel arm and the second swivel arm include at least one palm grip, finger grip, or a combination thereof configured to assist in gripping the collection bin.

In one aspect, the gripper assembly further comprises a first bumper provided on the first gripper arm; and a second bumper provided on the second gripper arm. The first bumper and the second bumper are configured to limit an opening between the first swivel arm and the second swivel arm.

In some embodiments, a motor vehicle includes any embodiments or aspects of the bin tipper described above, and a bin tunnel configured to house the bin tipper.

In one aspect of the motor vehicle, the bin tipper is configured to engage with the collection bin at a side of the motor vehicle.

In one aspect of the motor vehicle, the bin tipper is configured to engage with the collection bin at a rear of the motor vehicle.

In one aspect of the motor vehicle, the motor vehicle further includes a hopper. The bin tipper is configured to deposit the contents of the collection bin into the hopper. The hopper is configured to deposit the material into a desired location within the motor vehicle.

In some embodiments, a method of using a bin tipper to invert a collection bin and deposit contents of the collection bin into a desired location includes receiving the collection bin within a gripper assembly including a gripper mount having gripper arms mounted thereon, lifting the collection bin, and inverting the collection bin. The bin tipper includes a vertical support column and a cam track adjacent to the vertical support column, the cam track including a proximal portion parallel to the vertical support column and a distal portion provided at an angle with respect to the vertical support column. A first end of the gripper mount is pivotally mounted to a structural member mounted to the vertical support column and a second end of the gripper mount includes a cam follower extending therefrom. The cam follower configured to move within the proximal portion and the distal portion of the cam track. The step of lifting the collection bin includes translating the gripper assembly upwards along the vertical support column and the proximal portion of the cam track with the cam follower being located within the proximal portion of the cam track. The step of inverting the collection bin includes pivoting the gripper mount with respect to the structural member and moving the cam follower along the distal portion of the cam track in a direction extending away from the vertical support column.

BRIEF DESCRIPTION OF THE DRAWINGS

The disclosure will become more fully understood from the following detailed description, taken in conjunction with the accompanying figures, in which:

FIG. 24 illustrates a prior art bin tipper in which a gripper carriage is pulled by a chain along a cane structure to lift and tip a collection bin.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting. Although the specification refers primarily to lifting a bin and depositing material contained in the collection bin into a motor vehicle, it should be understood that the subject matter described herein is applicable to being lifted and deposited in other environments, such as for example a warehouse or other worksite. The material to be lifted and deposited often will contain information and will be recyclable, but the invention can be applied to other materials that do not contain information and/or are not recyclable.

FIGS. 1-23 illustrate embodiments of a bin tipper for lifting at least one collection bin containing material and depositing the material into a desired location. Examples of the materials that can be deposited include paper, uniforms, backup tapes, videos, credit cards, hard drives, e-scrap and compact discs. However, the material may be anything else that is capable of being deposited into the motor vehicle. In general, the bin tipper can be configured to lift collection bins from, for example, ground level or dock level. The collection bin lifted by the bin tipper may be any of a variety of collection bins, such as wheeled containers, carts or other bins.

Figure 1:
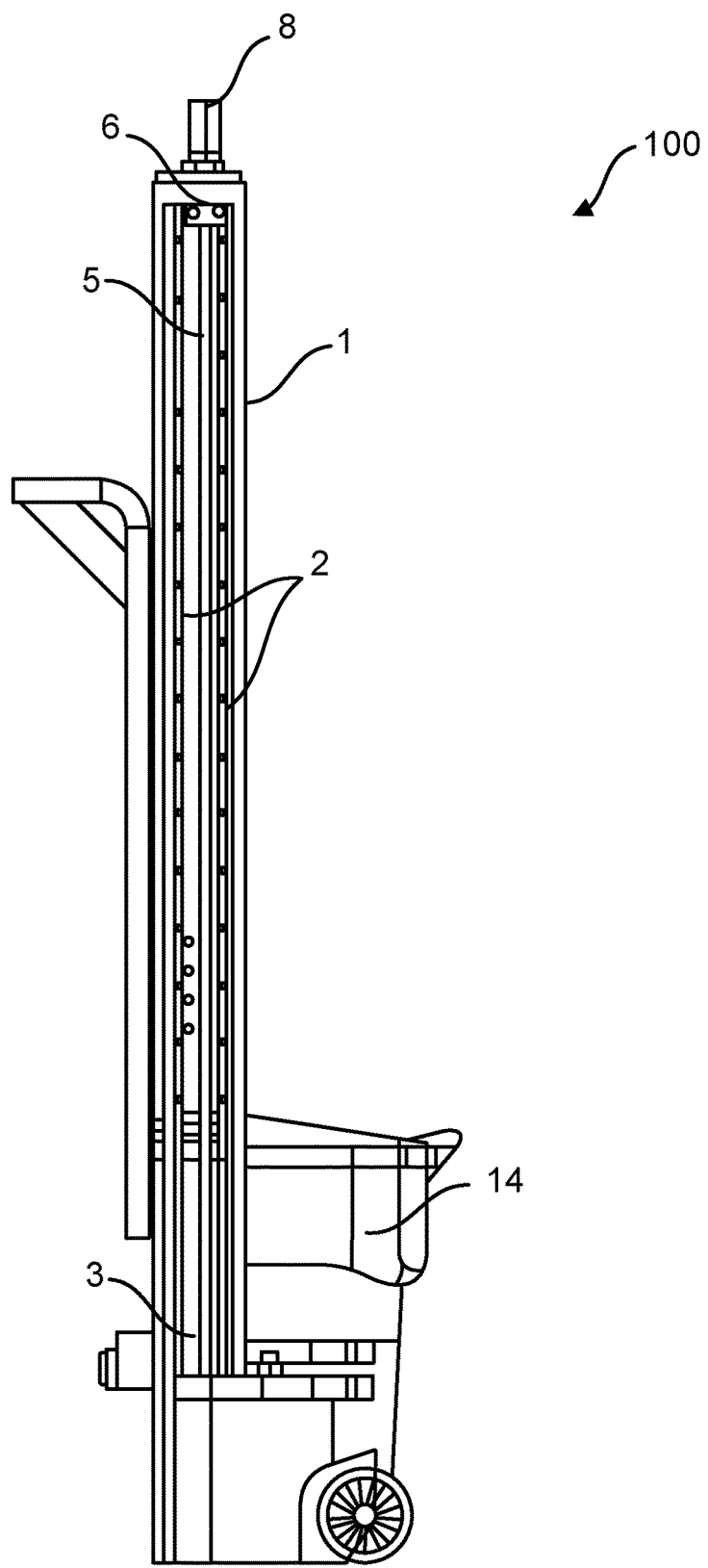
FIG. 1 is a perspective view of a bin tipper.
Figure 2:
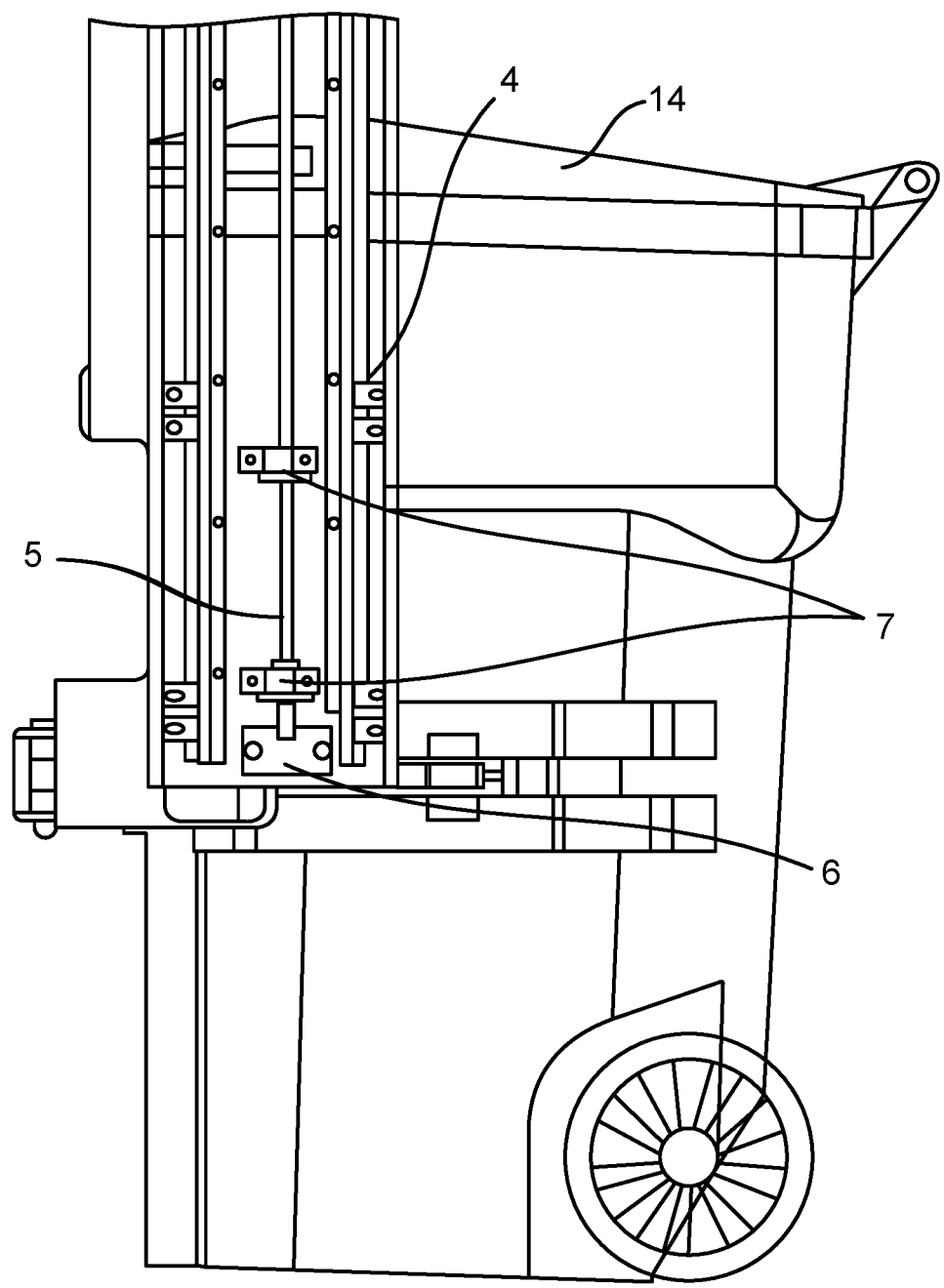
FIG. 2 illustrates components of the bin tipper of FIG. 1 that allow the bin tipper to lift a collection bin.
Figure 3:
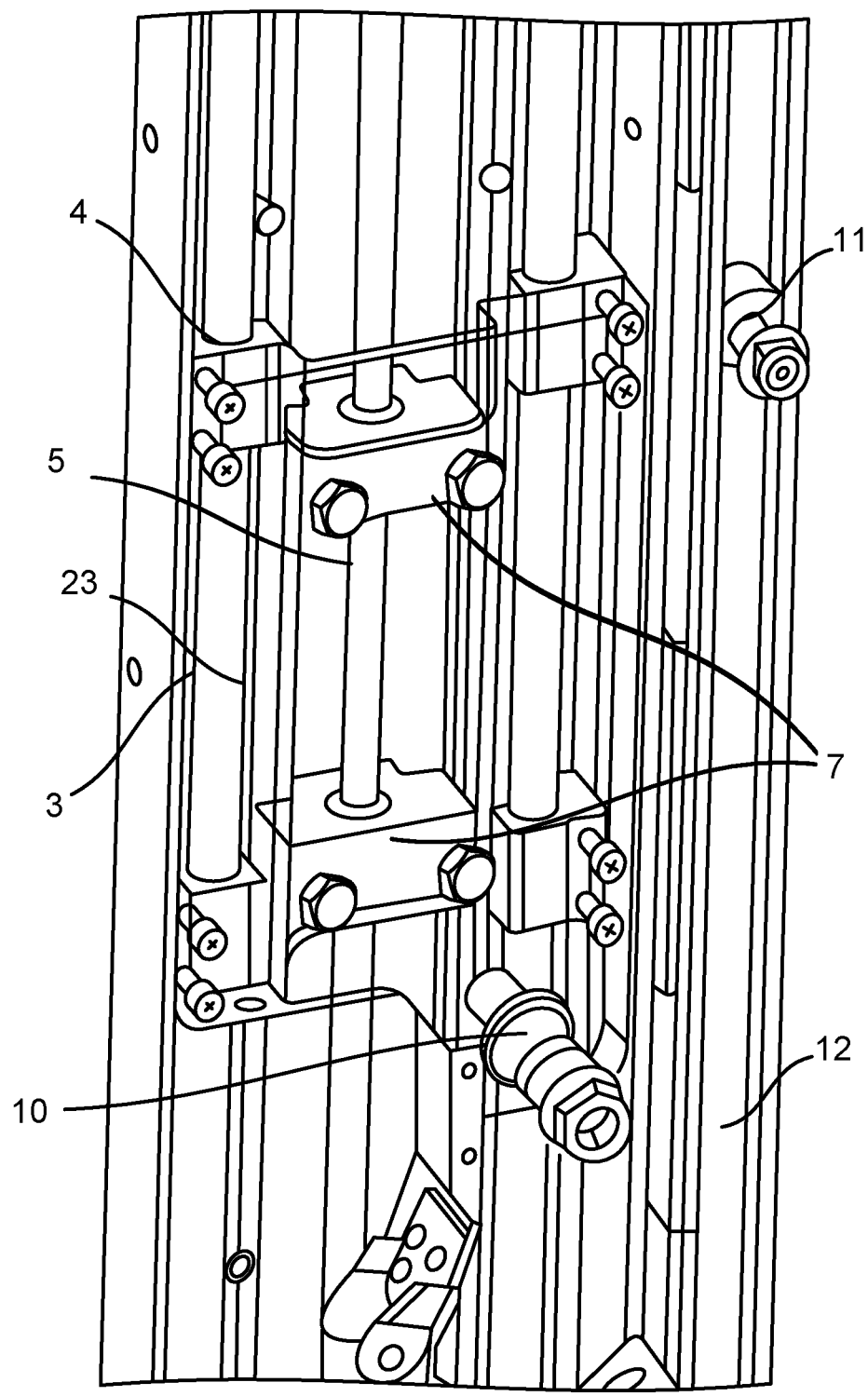
FIG. 3 illustrates components of the bin tipper of FIG. 1 that allow the bin tipper to lift and tip a collection bin.

A bin tipper 100 receives a collection bin 14, lifts the collection bin 14, and deposits/empties the contents (i.e., material) of the collection bin 14 into a desired location, for example, into a hopper 300 (see FIGS. 14-23). Referring to FIGS. 1-3, the bin tipper 100 includes a support structure comprised of a support column 1 and a cam track 12. Although the specification refers primarily to a vertical support column 1, it should be understood that the support column 1 could be provided in a different orientation (e.g., tilted), provided the support column 1 is adjacent to the cam track 12. The vertical support column 1 and the cam track 12 are integrally formed in a side-by-side configuration. As will be explained in further detail below, a proximal portion of the cam track 12 is parallel to the vertical support column 1, while a distal portion of the cam track 12 is angled with respect to the vertical support column 1. For example, the distal portion of the cam track 12 may be perpendicular to the vertical support column 1, the distal portion of the cam track 12 may be provided at an acute angle with respect to the vertical support column 1, or the distal portion of the cam track 12 may be provided at an obtuse angle with respect to the vertical support column 1. For example, the distal portion of the cam track 12 may be provided at an acute angle with respect to the vertical support column 1 to lower the lip of the collection bin in a dump position. In alternative implementations (not illustrated), the cam track 12 may be any desired arch or scroll shape.

Figure 4:
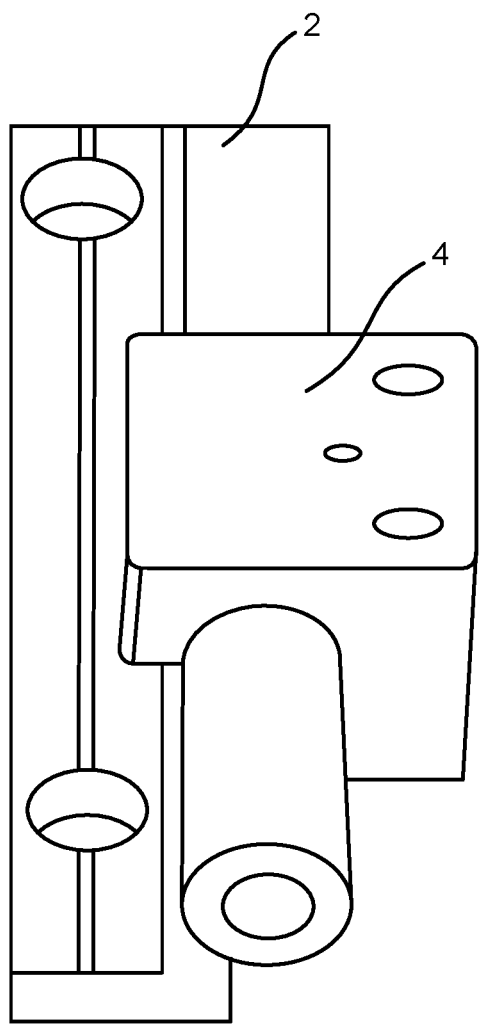
FIG. 4 illustrates a bearing block and guide rail of the bin tipper of FIG. 1.
Figure 5:
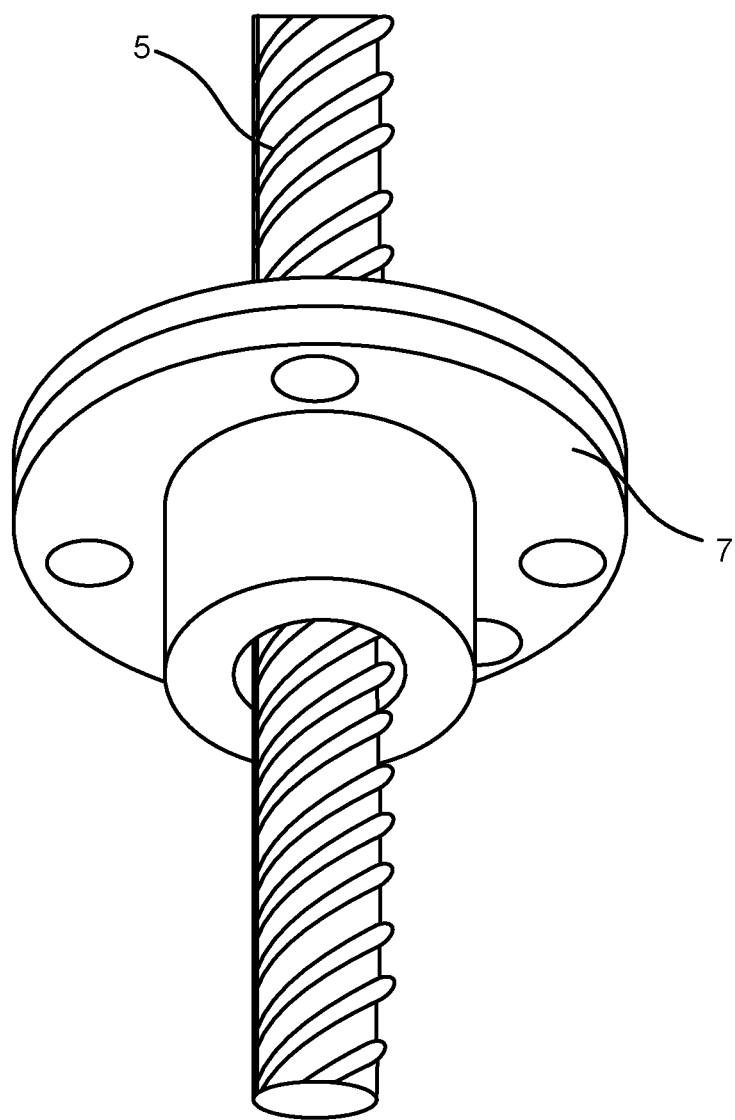
FIG. 5 illustrates a lead screw and a lead screw nut of the bin tipper of FIG. 1.
Figure 13:
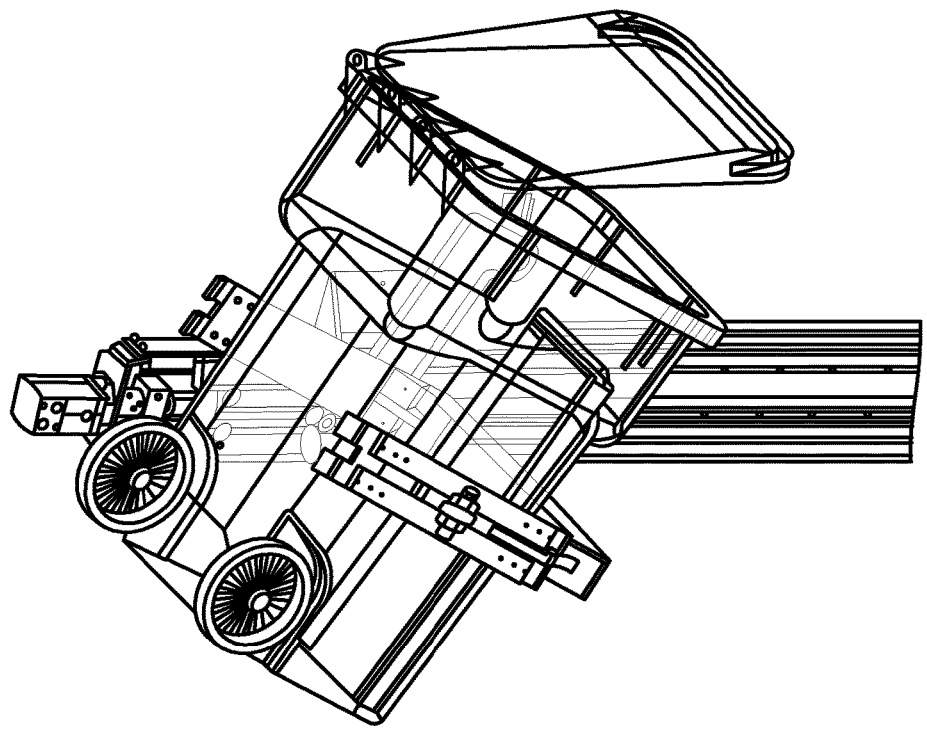
FIG. 13 illustrates Step 4 of the operation of the bin tipper of FIG. 1 in which the lift carriage reaches a predetermined height along the support column of the support structure, while the gripper mount is pivoted about a stub shaft due to a cam follower position at a sufficient angle to tip the collection bin over and empty the contents thereof.
Figure 13:
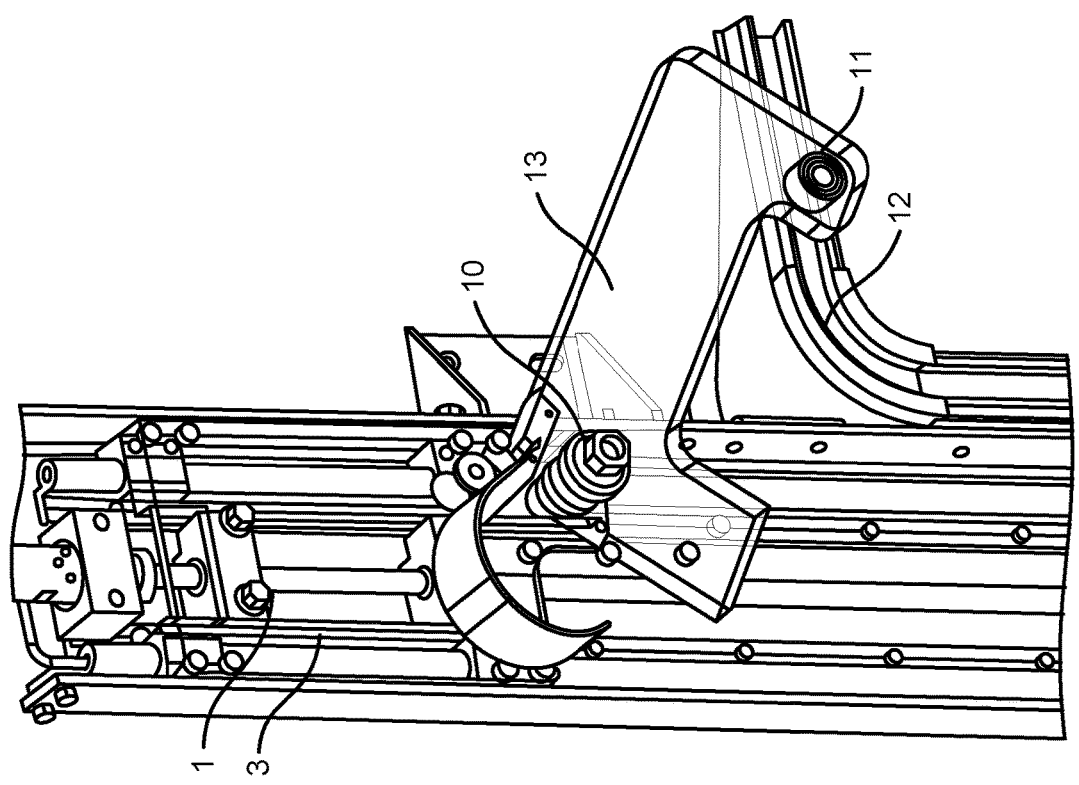
Figure 14:
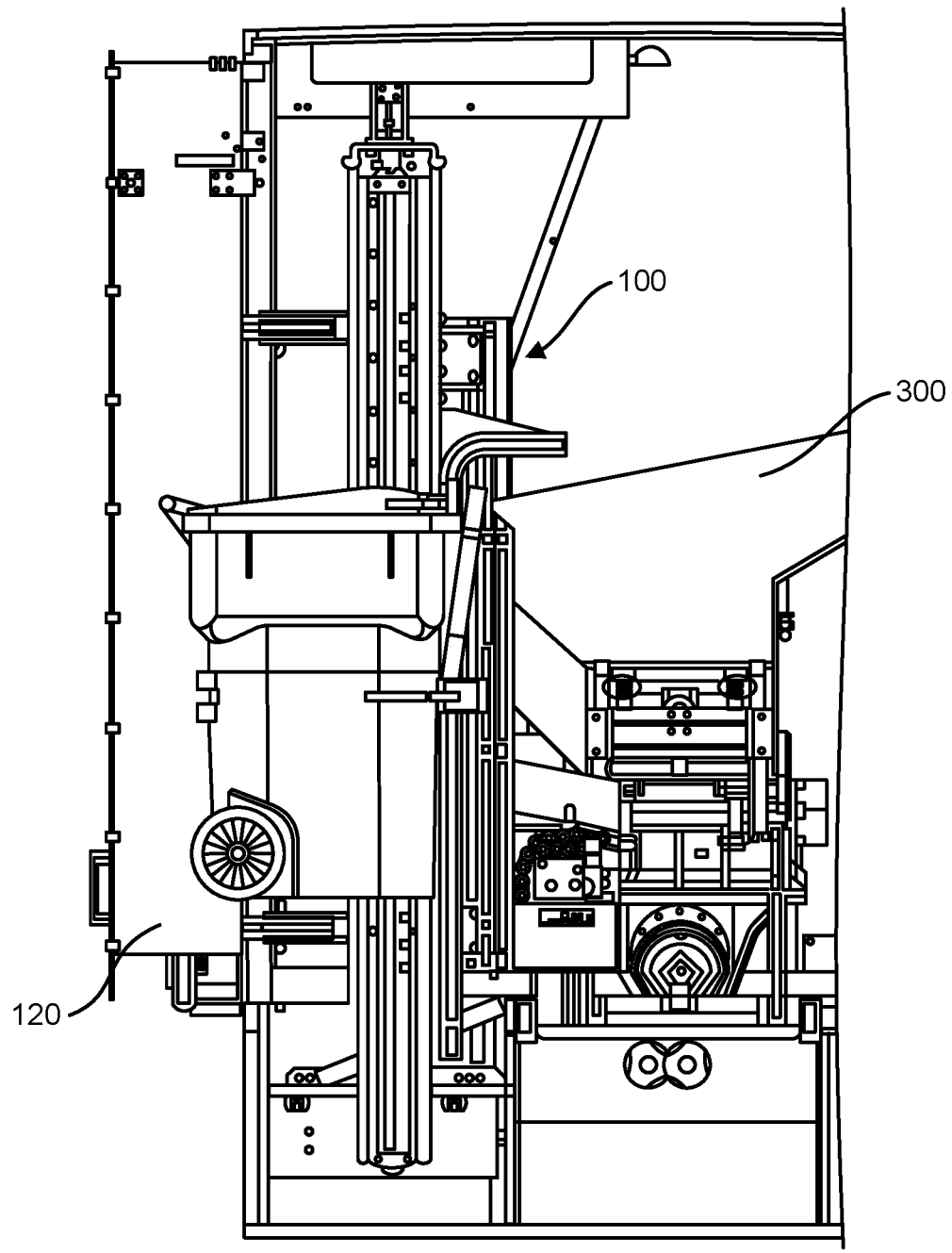
FIG. 14 illustrates a bin tunnel enclosing the bin tipper of FIG. 1.

The vertical support column 1 includes a carriage guide comprised of a pair of vertical, parallel guide rails 2. The guide rails 2 are mounted to the vertical support column 1 by any known means, for example, via anchor pedestals that bolt to the vertical support column 1. A lift carriage 3 includes a suitable shaped structural member 23 and a plurality of guide bearing blocks 4. As used herein, "suitable shaped structural member 23" refers to a structural member 23 capable of: 1) locating the bearing blocks and pivot point in order to spread load points and control forces on components, 2) locating the stub shaft 10 for function, more or less at the center of gravity of the collection bin, to minimize forces required to rotate the collection bin, and 3) maintaining a suitable ground clearance to the bottom of the vertical support column 1, where a suitable ground clearance refers to making sure the components would clear a ramp at a predetermined ramp break over angle (e.g., 8 degrees). The structural member 23 is preferably a plate. As illustrated in the example of FIGS. 3 and 13, the structural member 23 is substantially rectangular, and four guide bearing blocks 4 are arranged such that one guide bearing block is positioned at each corner of the structural member 23. A maximum width of the structural member 23 is equal to a width of the vertical support column 1 such that the structural member 23 overlaps with the vertical support column 1, but does not overlap with the adjacent cam track 12. Depending on the shape of the structural member 23, different numbers of guide bearing blocks 4 may be used, for example, two, three, four, five, six, seven, eight, nine, ten, etc. As seen in FIG. 4, the guide bearing blocks 4 interface with the guide rails 2 such that the lift carriage 3, in particular, the structural member 23 is mounted to the vertical support column 1 and configured to repeatedly and reversibly translate upwards and downwards along the guide rails 2.

A lead screw 5 is anchored in a first end bearing block 6 at a top portion of the vertical support column 1 at a first end thereof, and is anchored in a second end bearing block 6 at a bottom portion of the vertical support column 1 at a second end thereof. The lead screw 5 interfaces with at least one lead screw nut, for example, a first lead screw nut 7 and a second lead screw nut 7, which are anchored to lift carriage 3. For example, the lead screw 5 may be a long screw shaft extending from the bearing block 6 at the top through both lead screw nuts 7 to the bearing block 6 at the bottom. A drive motor 8 (e.g., hydraulic or electric) fixed to the vertical support column 1, for example, at a top of the vertical support column 1, drives the lead screw 5 to translate the lift carriage 3 along the vertical support column 1. The bin tipper 100 does not include a chain. Elimination of the chain reduces the difference between the power requirement for gripping the collection bin and the power requirement for lifting the collection bin. The lead screw arrangement reduces the peak power required to lift and overturn the collection bin from 11 HP to approximately 6-8 HP, for example, 7 HP. The lead screw arrangement reduces the peak power required to lift and overturn the collection bin such that the peak power required to lift and overturn the collection bin is approximately equal to (plus or minus 1 HP) the required gripping power. As a result, both functions may be powered by the same hydraulic system pump. The lead screw arrangement also allows for smooth translation and bin overturning action.

The material, pitch and thread geometry of the lead screw 5 and the first and second lead screw nuts 7 may be selected from any known design. In general, the lead screw 5 may be made of metal and include helical threads on an exterior thereof (see FIG. 5), and the first and second lead screw nuts 7 may be made of a self-lubricating polymer compound. For example, the lead screw 5 may be a long pitch screw made of a stainless steel that does not require lubrication (e.g., corrosion resistant stainless steel with a polished finish for a low coefficient of friction). Although any known lead screw or lead screw nut may be used, the lead screw 5 and the lead screw nuts 7 may be, for example, DryLin® lead screws and lead nuts. In one example, one lead screw 5 and two lead screw nuts 7 are used, but a number of lead screw nuts 7 may be varied depending on the desired payload.

Figure 6:
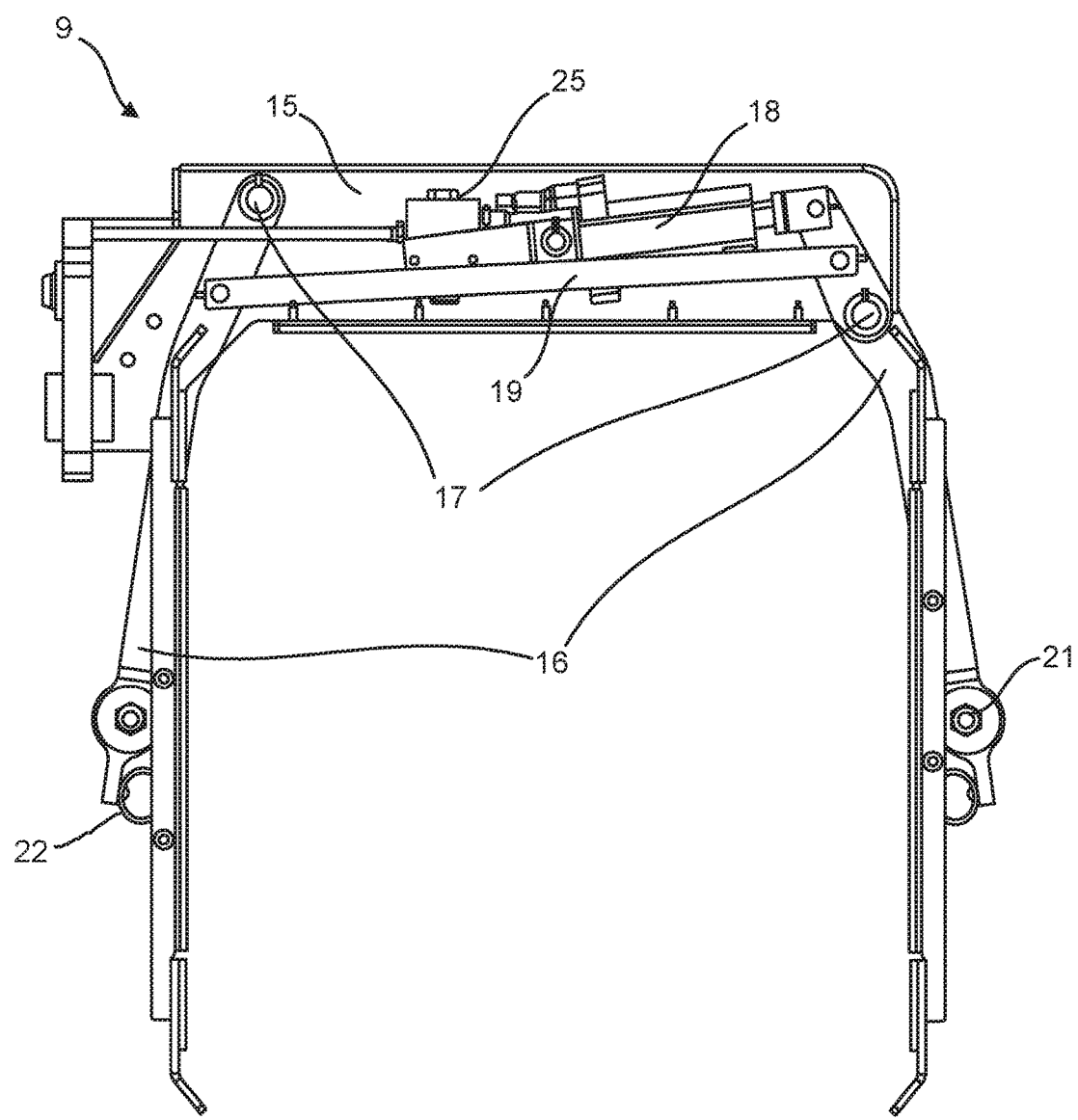
FIG. 6 illustrates a gripper assembly of the bin tipper of FIG. 1.
Figure 12:
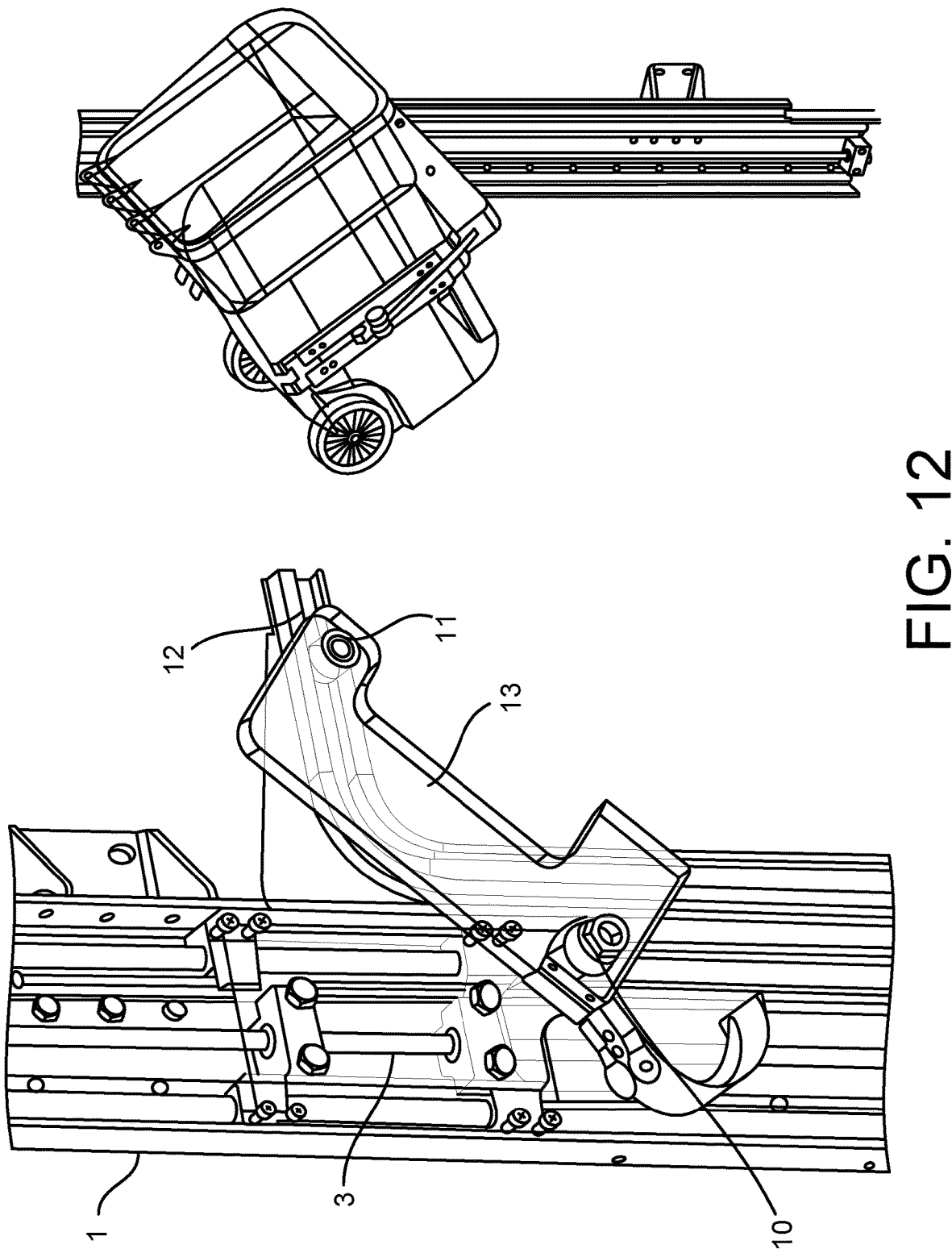
FIG. 12 illustrates Step 3 of the operation of the bin tipper of FIG. 1 in which the lift carriage continues to be driven upwards along the support column of the support structure, while the gripper mount begins to pivot about a stub shaft due to a cam follower position within a cam track to tilt the collection bin.

The bin tipper 100 further includes a gripper assembly 9 configured to receive and hold (grasp) the collection bin 14 to allow the bin tipper 100 to lift and tip the collection bin 14. The gripper assembly 9 includes a gripper mount 13 (i.e., a structural member, for example, a structural plate) that is pivotally mounted to the structural member 23 of the lift carriage 3 via a stub shaft 10. See FIG. 12. In the example of FIG. 6, the gripper mount 13 is C-shaped to provide gripper weldment supporting, bending strength and clearance to components in the gripper path of travel. In other examples, the gripper mount 13 may be any other suitable shape. The gripper mount 13 is sized and shaped to overlap with both the vertical support column 1 and the cam track 12. As illustrated in FIG. 12, the stub shaft 10 extends through a bottom, center portion of the structural member 23 of the lift carriage 3 and a bottom portion of the gripper mount 13 on a side of the gripper mount 13 furthest away from the cam track 12 (i.e., a first end or distal end of the gripper mount 13). In particular, in the example of FIG. 12, the stub shaft 10 extends through a bottom, left portion of the gripper mount 13, as the cam track 12 is provided on the right side of the vertical support column 1. A cam follower 11 is configured to move within the cam track 12 along a length of the cam track 12. The cam follower 11 extends through the top portion of the gripper mount 13 (i.e., a second end or proximal end of the gripper mount 13) toward and into cam track 12. In particular, in the example of FIG. 12, the cam follower 11 which extends through a top, right portion of the gripper mount 13 is shown being guided inside cam track 12. By virtue of the stub shaft 10 and the cam follower 11, the gripper mount 13 is pivotally fixed to both the vertical support column 1 and the cam track 12, for horizontal rotation on parallel axis.

The gripper mount 13 may include a cable organizer 27 (FIG. 11) attached on a side thereof. For example, the cable organizer 27 may be attached proximate to the stub shaft 10. The cable organizer 27 is configured to house hoses and/or wiring equipment mounted to the gripper assembly 9. The cable organizer 27 is partially illustrated in FIG. 11. The cable organizer 27 may be, for example, the E-Chain System® E2/000 Series 2400/2500 by Igus®.

Figure 7:
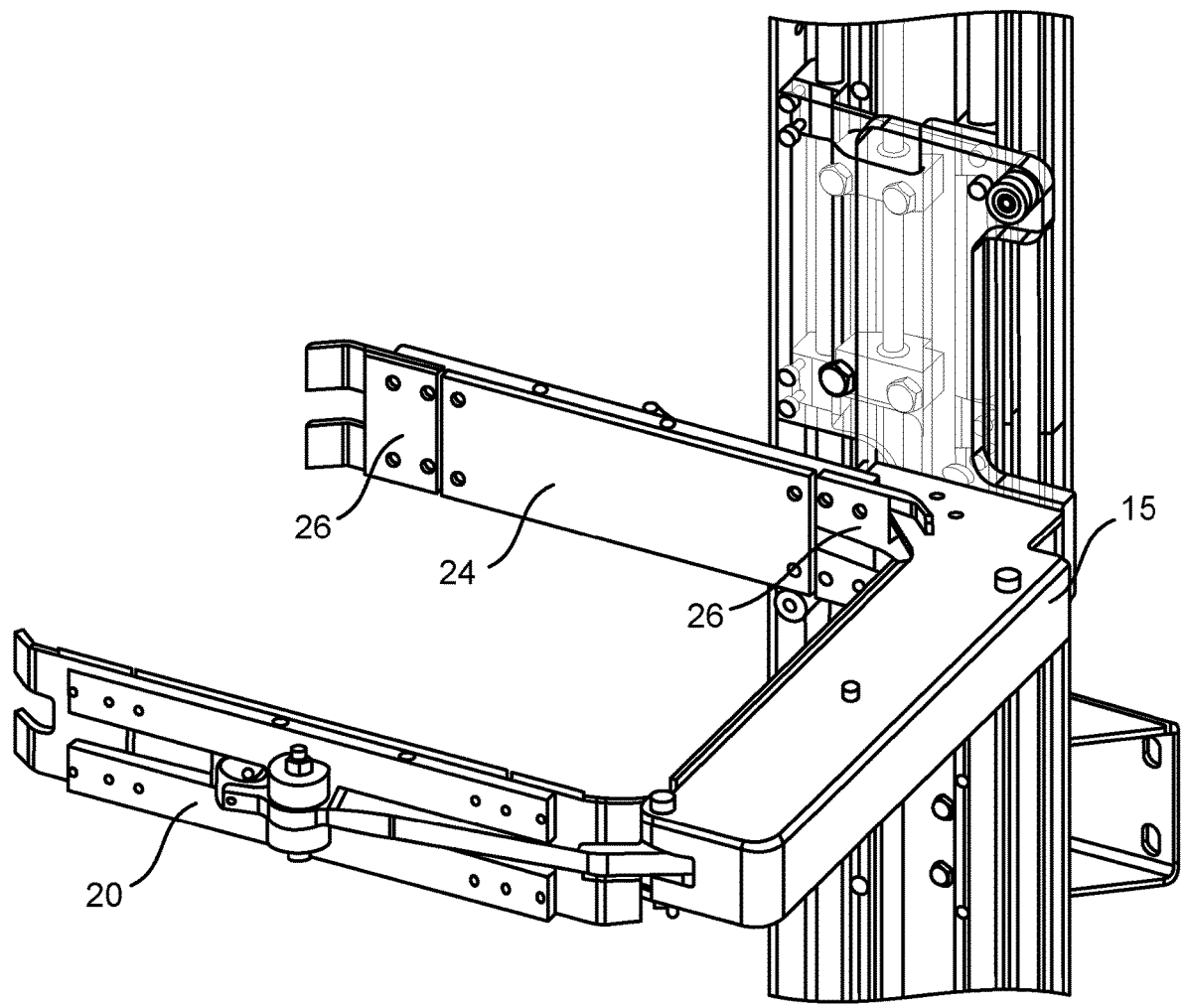
FIG. 7 illustrates swivel arms of the gripper assembly of FIG. 6.
Figure 8:
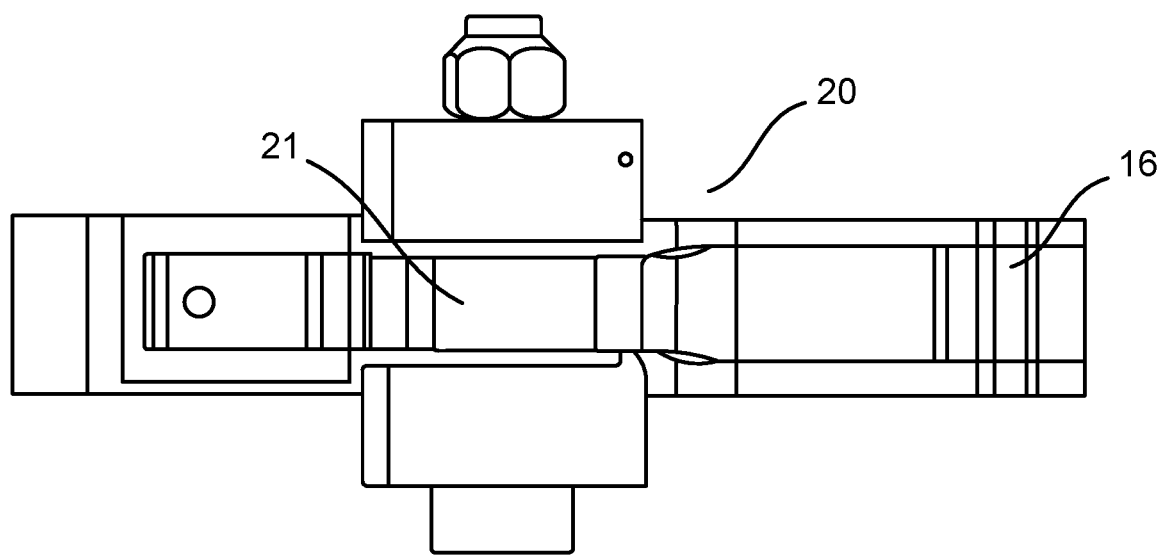
FIG. 8 illustrates a ball joint connecting the swivel arms and gripper arms of the gripper assembly of FIG. 6.
Figure 9:
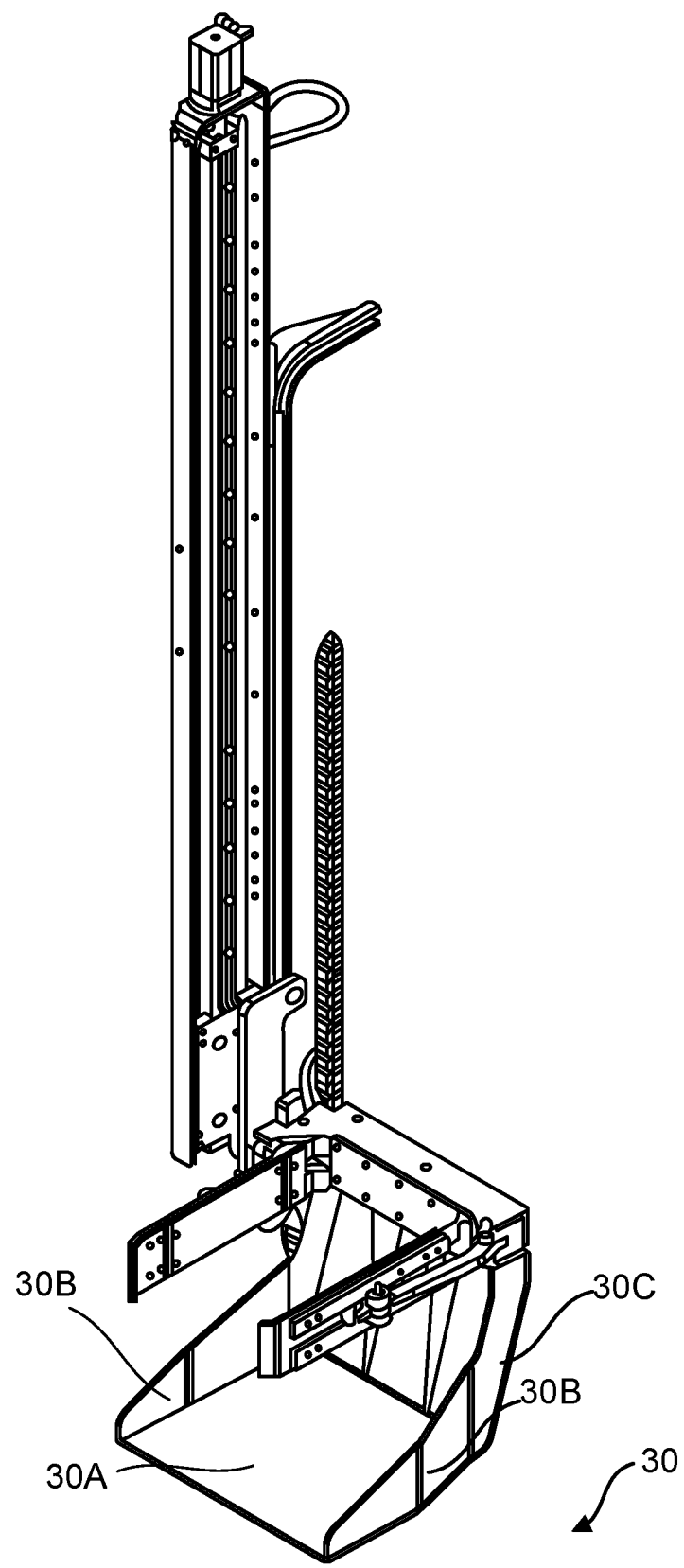
FIG. 9 illustrates a side perspective view of the bin tipper of FIG. 1, equipped with an optional support platform.

Referring to FIGS. 6-8, the gripper assembly 9 further includes a gripper weldment 15, which is weld-attached to the gripper mount 13 to create an integrated structure. The gripper weldment 15 serves as a mount and housing for all the actuating parts of the gripper assembly 9. Gripper arms 16 are pivotally mounted to the gripper mount 13 via the gripper weldment 15 at pivots 17. A pivot 17 of a first (left) gripper arm 16 is provided at a different distance from ball joints 21 than a pivot 17 of a second (right) gripper arm 16. A linear actuator 18, for example, a hydraulic cylinder, is configured to extend and retract to reversibly and repeatedly move the right gripper arm 16 (i.e., only one of the gripper arms 16) inwards or outwards. A link arm 19 is pivotally connected to the both gripper arms 16 to move the first gripper arm 16 in an opposite rotational direction from the second gripper arm 16. A pilot operated check valve 25 is configured to hold the gripper arms 16 in position when a pressure source is turned off. Pilot pressure is required to open the pilot operated check valve 25 and actuate the linear actuator 18 to open the gripper arms 16. A pair of swivel arms 20 is provided, with each swivel arm 20 being mounted to a gripper arm 16. A middle of the swivel arm 20 is connected to an end of the gripper arm 16 via a ball joint 21. The range of motion of the swivel arm 20 from a fixed horizontal plane is restricted by mechanical contact of the interfacing components at the ball joint 21 (pivot joint). See FIG. 8. A small gap between the gripper arm 16 and the pivot hubs of the swivel arm 20 restricts movement. The swivel arms 20 may be made from any suitable material, for example, wrought aluminum, a cast component, or steel. A surface of each of the swivel arms 20 may include one or more palm grips 24, one or more finger grips 26, or a combination of one or more palm grips 24 and one or more finger grips 26. See FIG. 7. The palm grip 24 is the main grip configured to grasp the sides of the collection bin 14. The finger grip 26 is configured to limit bin rotation as the collection bin 14 is overturned. The finger grip 26 is provided as a separate piece to add some flexibility to interchange tip designs for different shaped collection bins. Each of the palm grips 24 and the finger grips 26 include a resilient friction material on a surface thereof to assist in gripping the collection bin 14. A bumper 22 (i.e., a resilient stop) is provided on each of the gripper arms 16 to limit the opening between the swivel arms 20. This prevents the swivel arms 20 from interfering with the bin tunnel 120.

Provision of the swivel arms 20 allows for a wider range of motion of the gripper assembly 9, as compared to conventional gripper assemblies comprised of two gripper arms having a fixed shape. In particular, the additional degrees of free motion of swivel arms 20 over conventional gripper arms, to allow the gripper assembly to grip a wider range or variety of collection bin sizes without add-ons or inserts. In addition, the swivel arms 20 increase a contact area of the collection bin 14, thereby increasing a gripping efficiency by reducing a force/power required to keep the collection bin 14 from slipping.

In some examples, the bin tipper 100 may optionally include a support platform 30 (see FIG. 9) configured to support the bottom of the collection bin 14. The support platform 30 may include a planar bottom surface 30A, side walls 30B, and a rear wall 30C. The support platform 30 may be affixed to the gripper weldment 15 by fasteners, welding, etc.

Although the specification refers primarily to lifting a single collection bin and depositing material contained in the single collection bin (i.e., a single wide bin tipper), it should be understood that the subject matter described herein is applicable to double wide bin tippers (i.e., a bin tipper capable of simultaneously lifting two collection bins and depositing material contained in the two collection bins).

Figure 21:
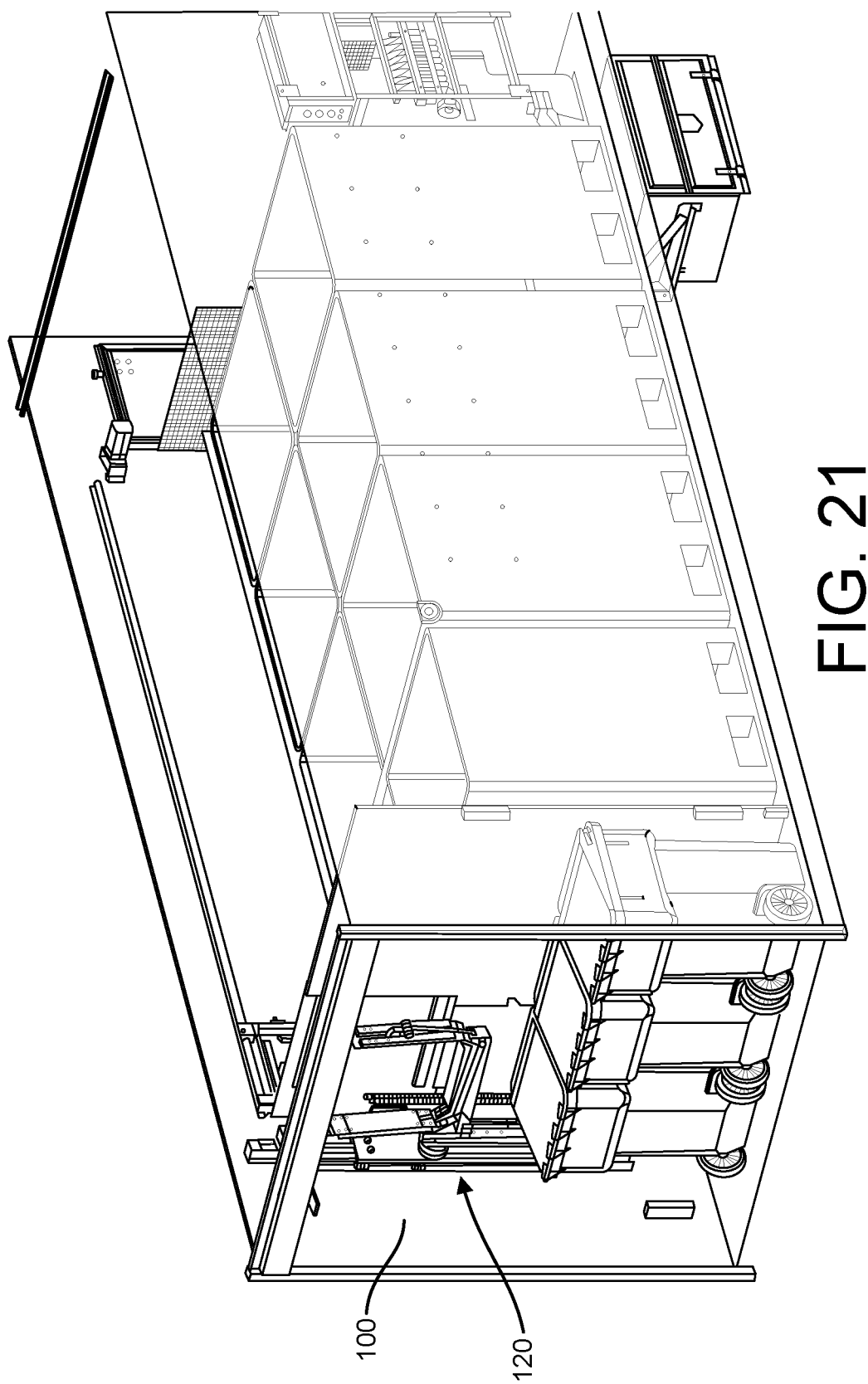
FIG. 21 illustrates the bin tipper of FIG. 1 installed in a rear load collection vehicle.
Figure 22:
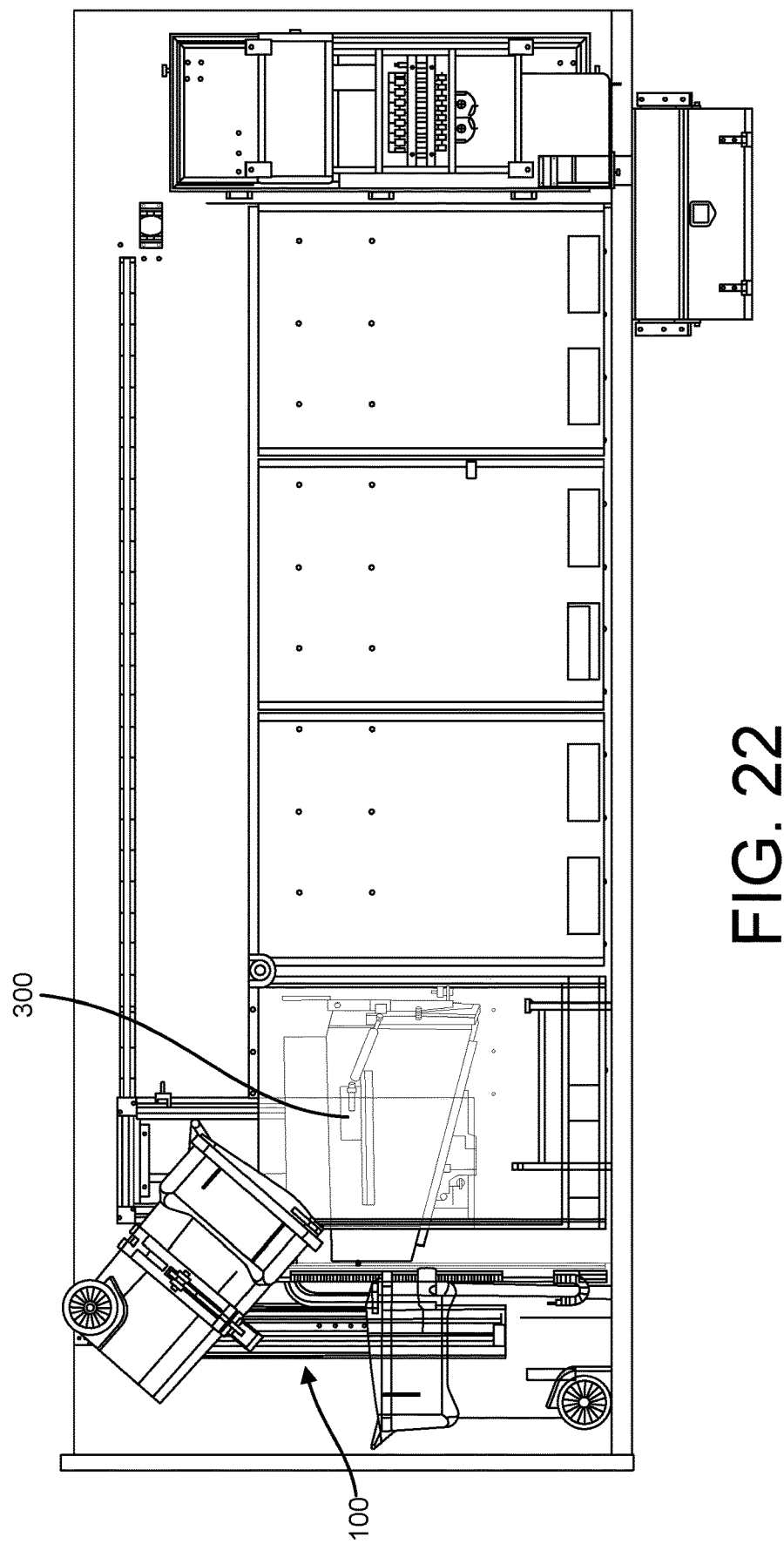
FIG. 22 illustrates the bin tipper of FIG. 21 as it travels to the highest dump point to empty the contents of the collection bin into a hopper.
Figure 23:
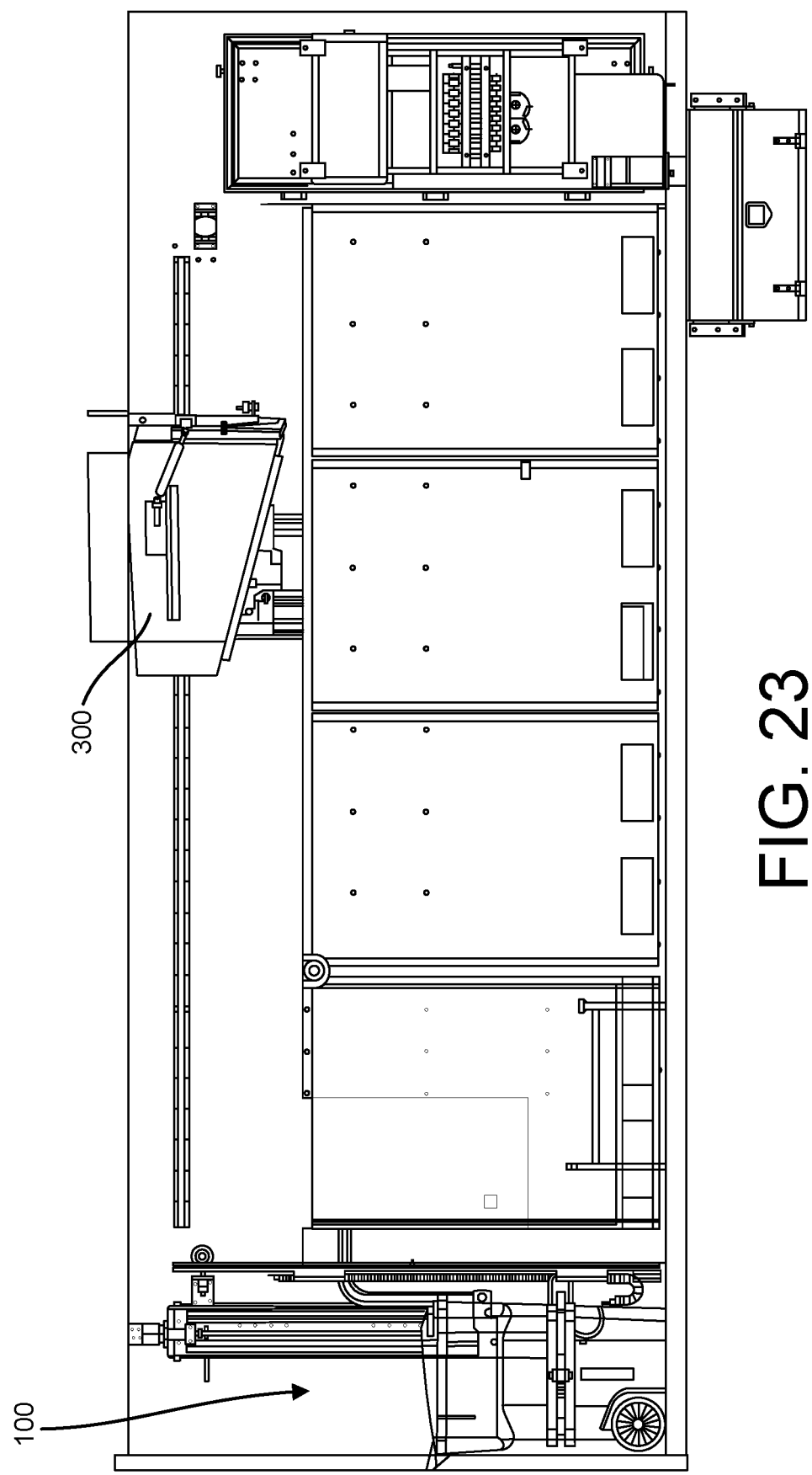
FIG. 23 illustrates the hopper of FIG. 22 emptying the contents thereof into a desired location in the collection vehicle.

In one embodiment (see FIG. 20), the bin tipper 100 is configured to engage with the collection bin 14 at a side of a motor vehicle (e.g., a side load collection truck). In another embodiment (see FIGS. 21-23), the bin tipper 100 is configured to engage with the collection bin 14 at a rear of the motor vehicle (e.g., a rear load collection truck). FIG. 23 illustrates the hopper 300 loading the material into a desired location within a material-storage compartment of the collection vehicle. As seen in FIGS. 22 and 23, the hopper 300 can move upwards, downwards, and side to side. Although FIGS. 22 and 23 illustrate the hopper 300 in a rear load collection truck, one of ordinary skill in the art would understand that the hopper 300 could also be used in the side load collection truck of FIG. 20. The hopper 300 will be described in further detail below.

The bin tipper 100 may be housed in a bin tunnel 120 for safety and security reasons. See FIG. 14. The bin tunnel 120 is configured to prevent the collected material from being exposed to wind and to prevent the operator from being caught by a collection bin 14 during raising or lowering of the same. The bin tunnel 120 can be constructed in a conventional manner. The components and configuration thereof of a preferred bin tunnel 120 are described in U.S. Pat. No. 6,588,691, the entire contents of which are hereby incorporated herein by reference. Due to the design of the bin tipper 100, the bin tunnel 120 of the present application may be shorter (approximately 12-18 inches, for example, 15 inches) than conventional bin tunnels (approximately 38 inches). As such, alternative methods of construction of the bin tunnel 120 are possible. For example, the bin tunnel support slides may be replaced with pivot links. Having a long bin tunnel negatively impacts the hopper design, since the hopper must clear the sides of the bin tunnel when the bin tunnel is closed. As a result, hoppers are made narrower, which lowers the volume capacity of the hopper. Because the bin tunnel 120 of the present application is short, a larger (wider) hopper with an increased volume capacity may be used. Use of a larger hopper is advantageous in that an operator may empty the collection bin without spillage or creation of undue forces on the hopper if the hopper is not emptied enough to receive the full volume of the new collection bill load.

Operation of the Bin Tipper

Figure 10:
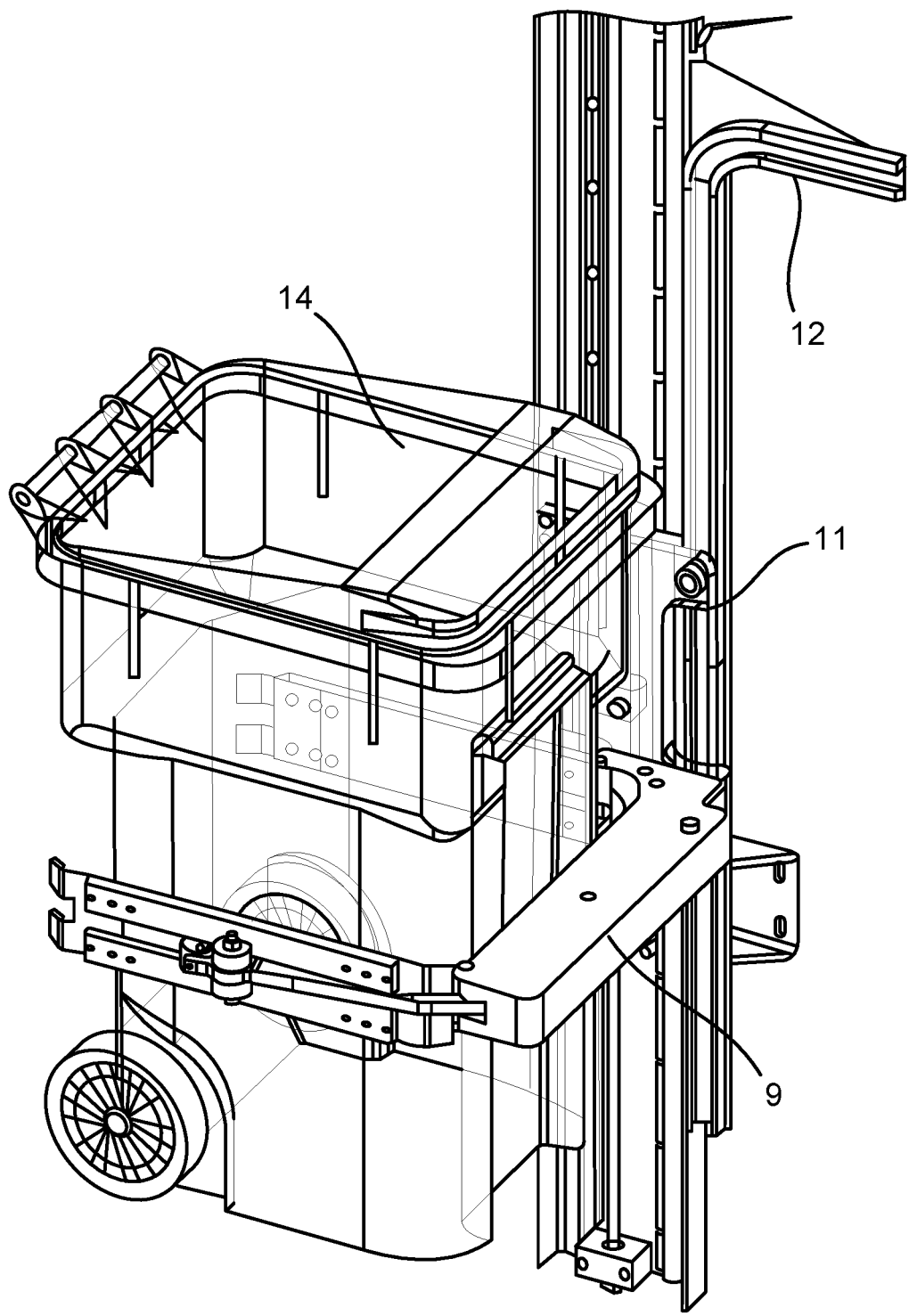
FIG. 10 illustrates Step 1 of the operation of the bin tipper of FIG. 1 in which a collection bin is secured in a gripper assembly of the bin tipper.
Figure 11:
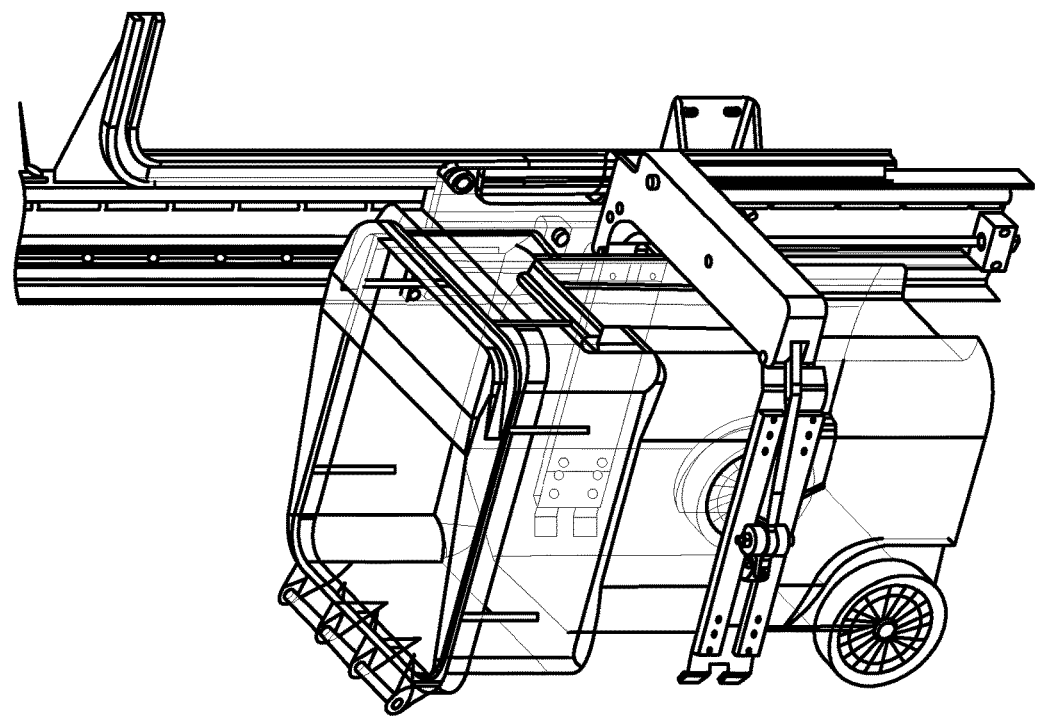
FIG. 11 illustrates Step 2 of the operation of the bin tipper of FIG. 1 in which the lift carriage and the gripper mount are driven upwards along the support structure.
Figure 11:
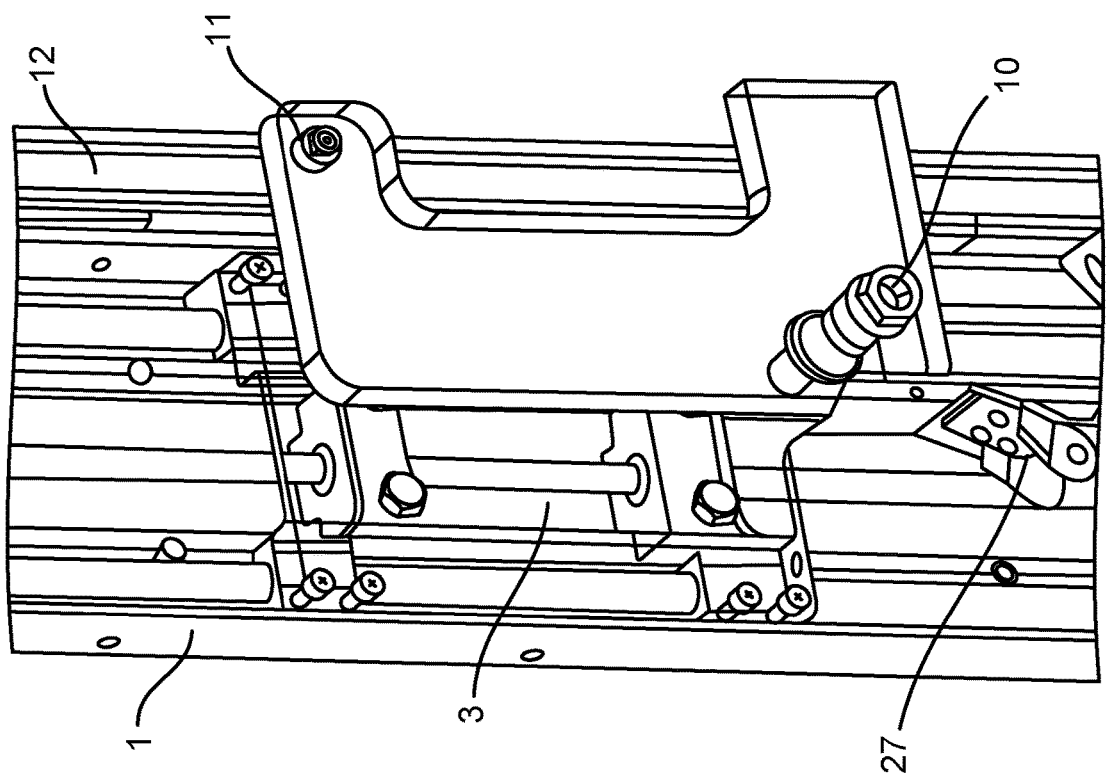
Figure 15:
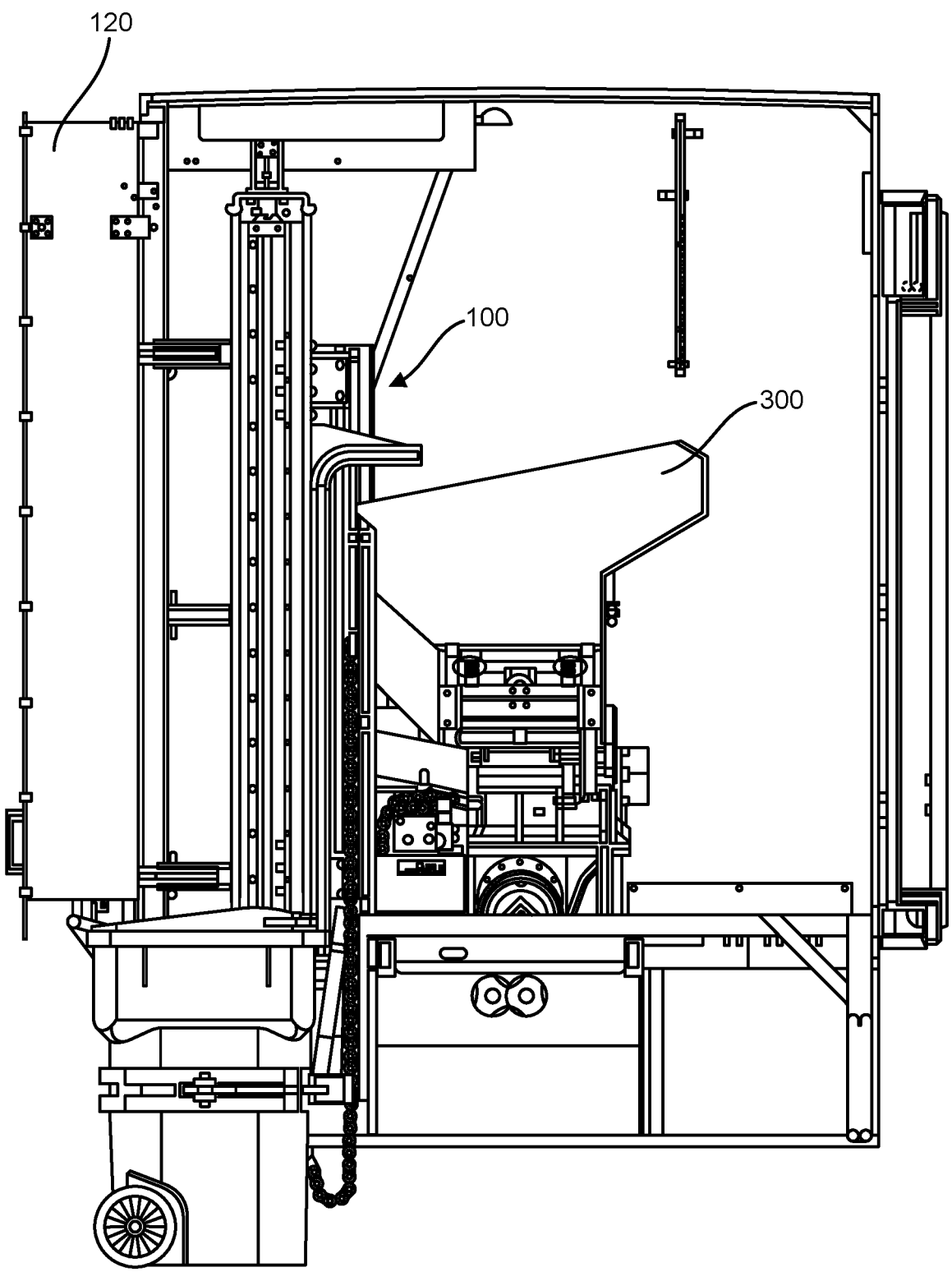
FIG. 15 is another view of Step 1 illustrated in FIG. 10.
Figure 16:
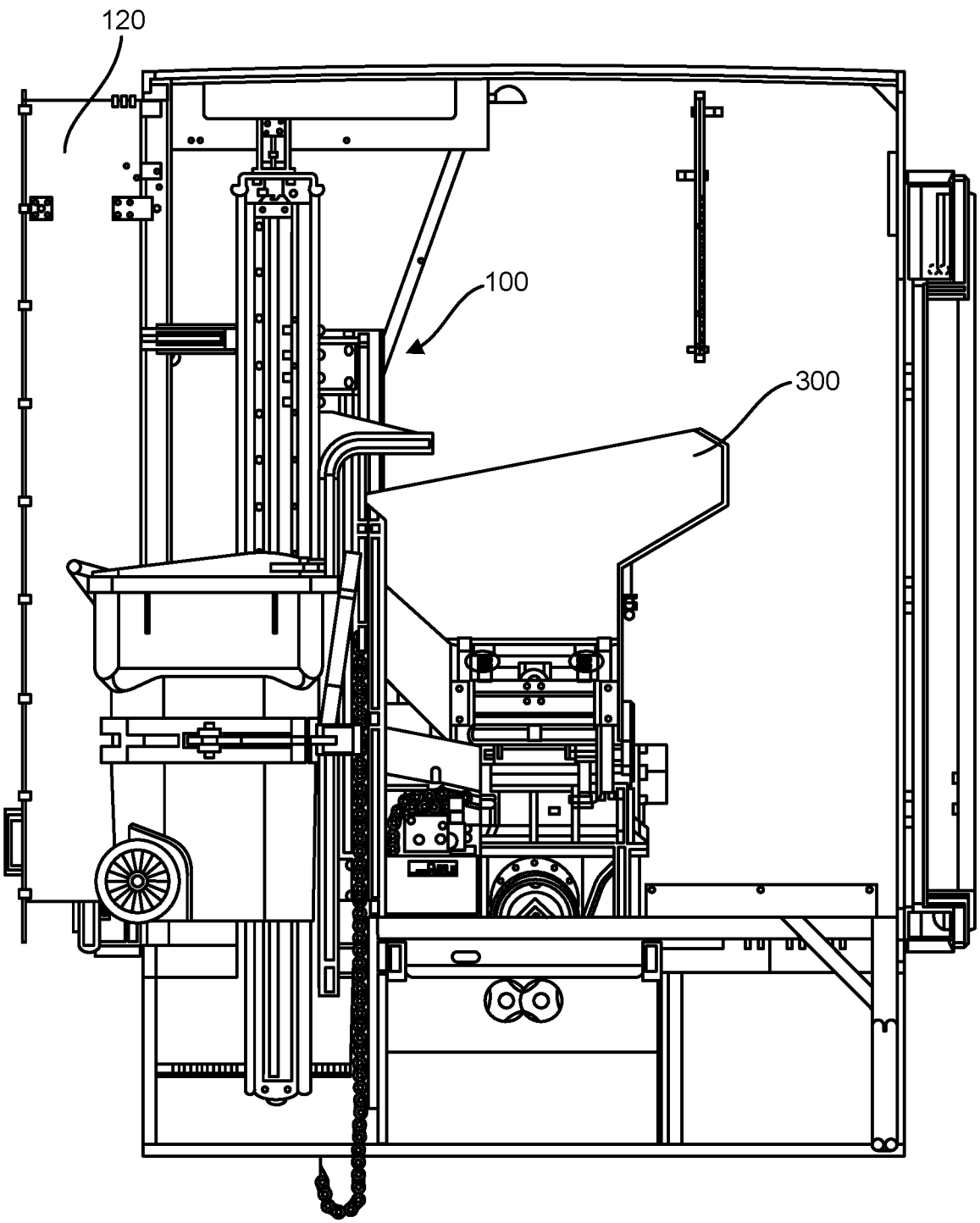
FIG. 16 is another view of Step 2 illustrated in FIG. 11.
Figure 17:
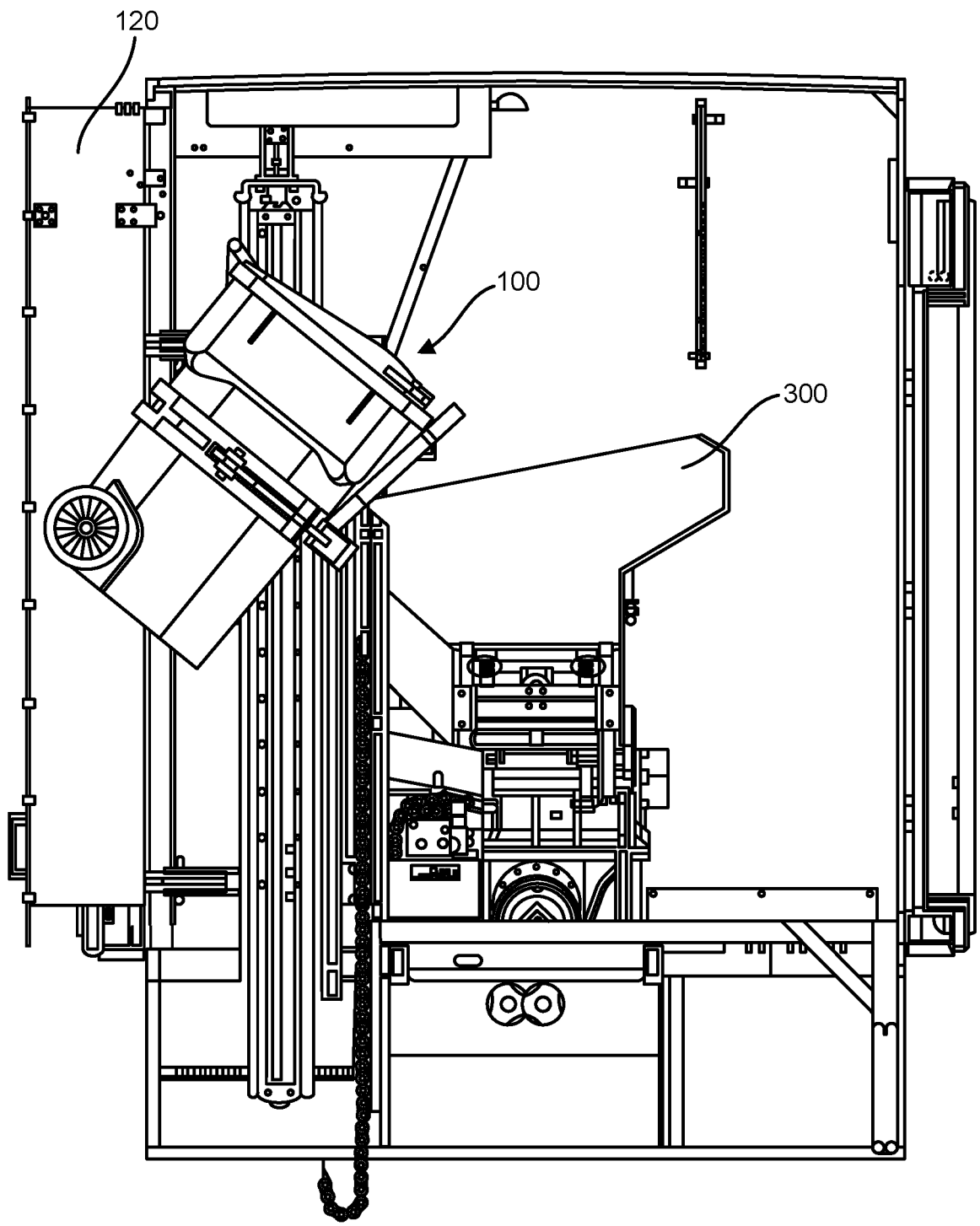
FIG. 17 is another view of Step 3 illustrated in FIG. 12.
Figure 18:
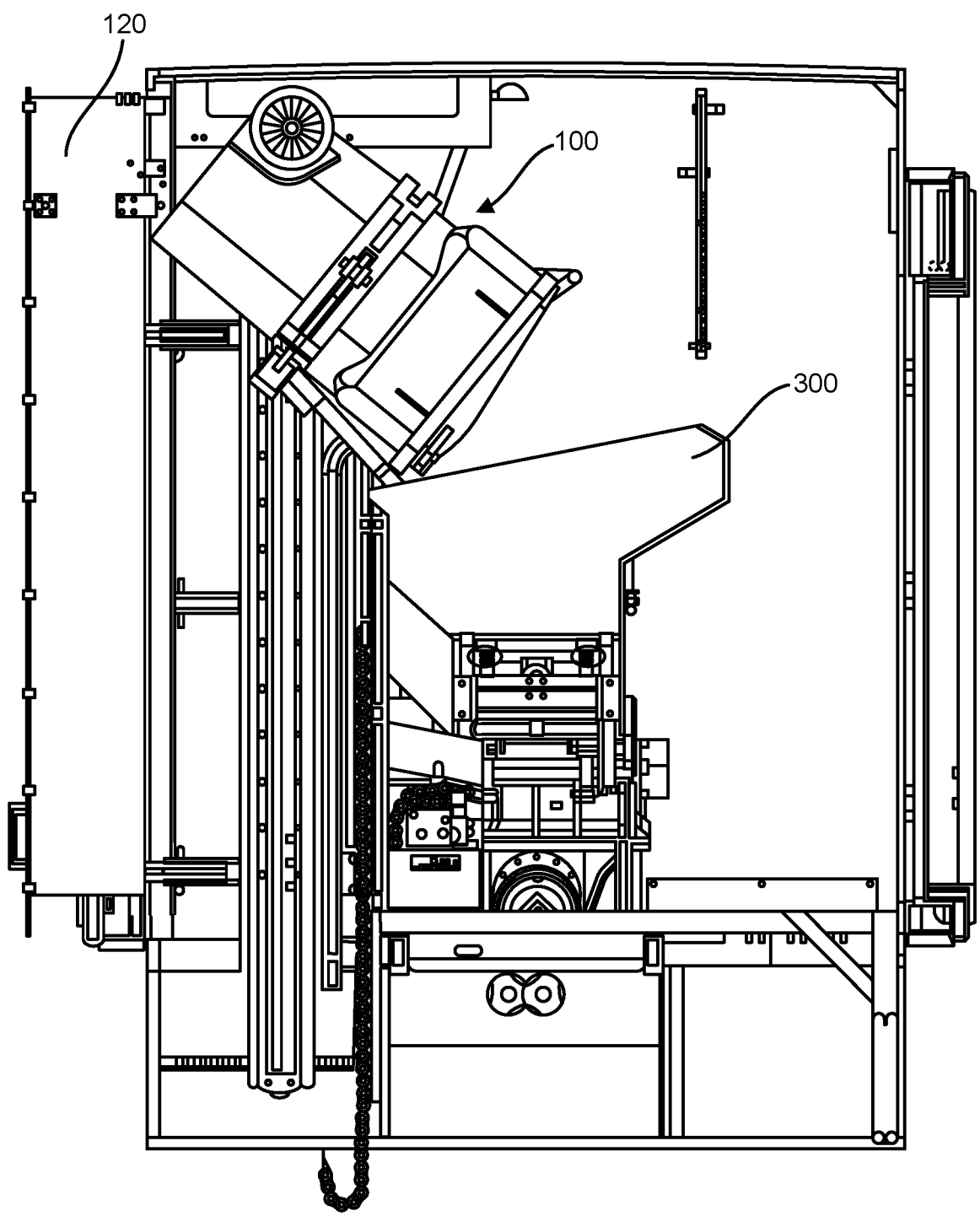
FIG. 18 is another view of Step 4 illustrated in FIG. 13.
Figure 19:
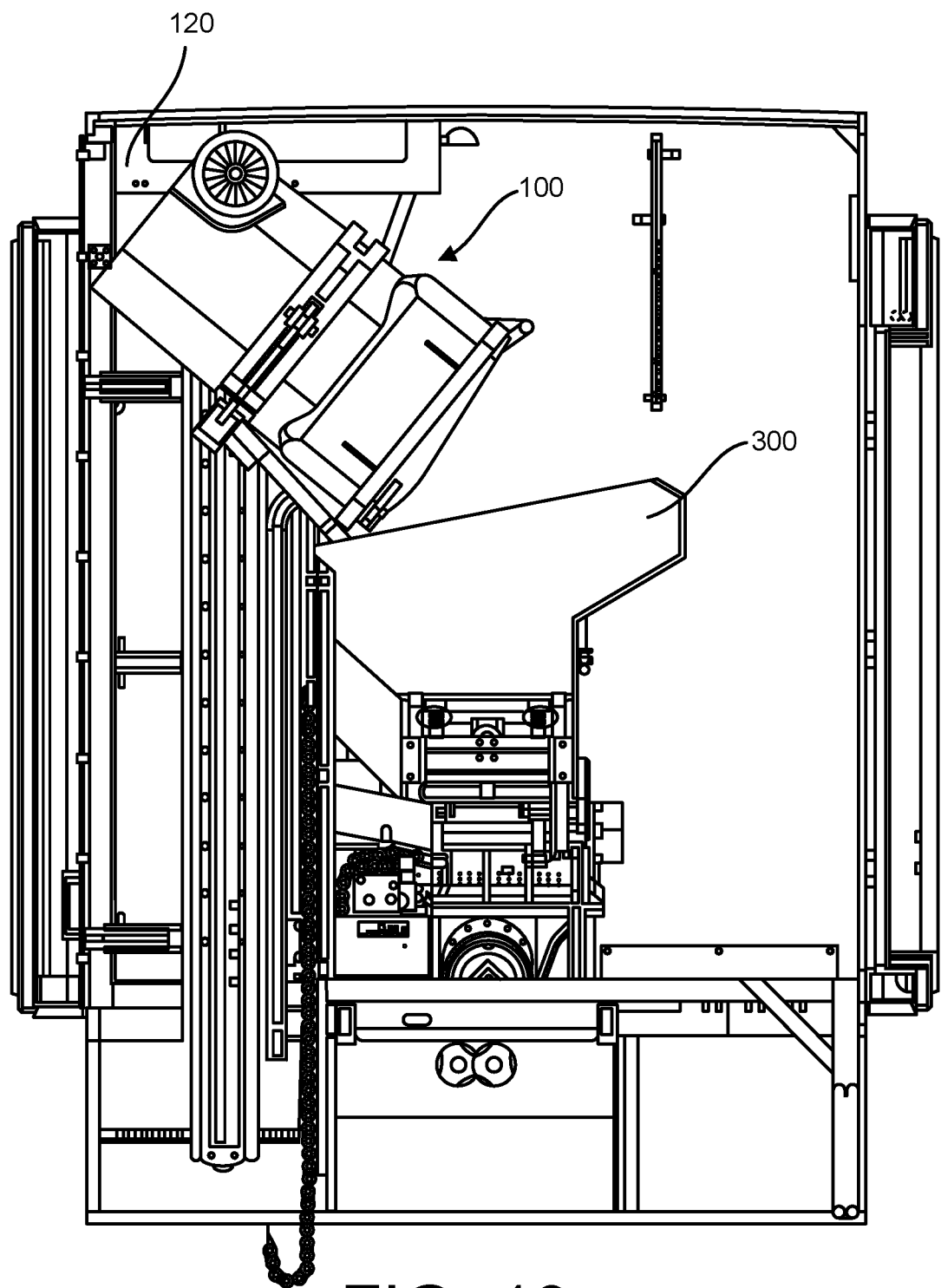
FIG. 19 illustrates a bin tunnel enclosing the bin tipper of FIG. 18. The bin tunnel is in the closed position.
Figure 20:
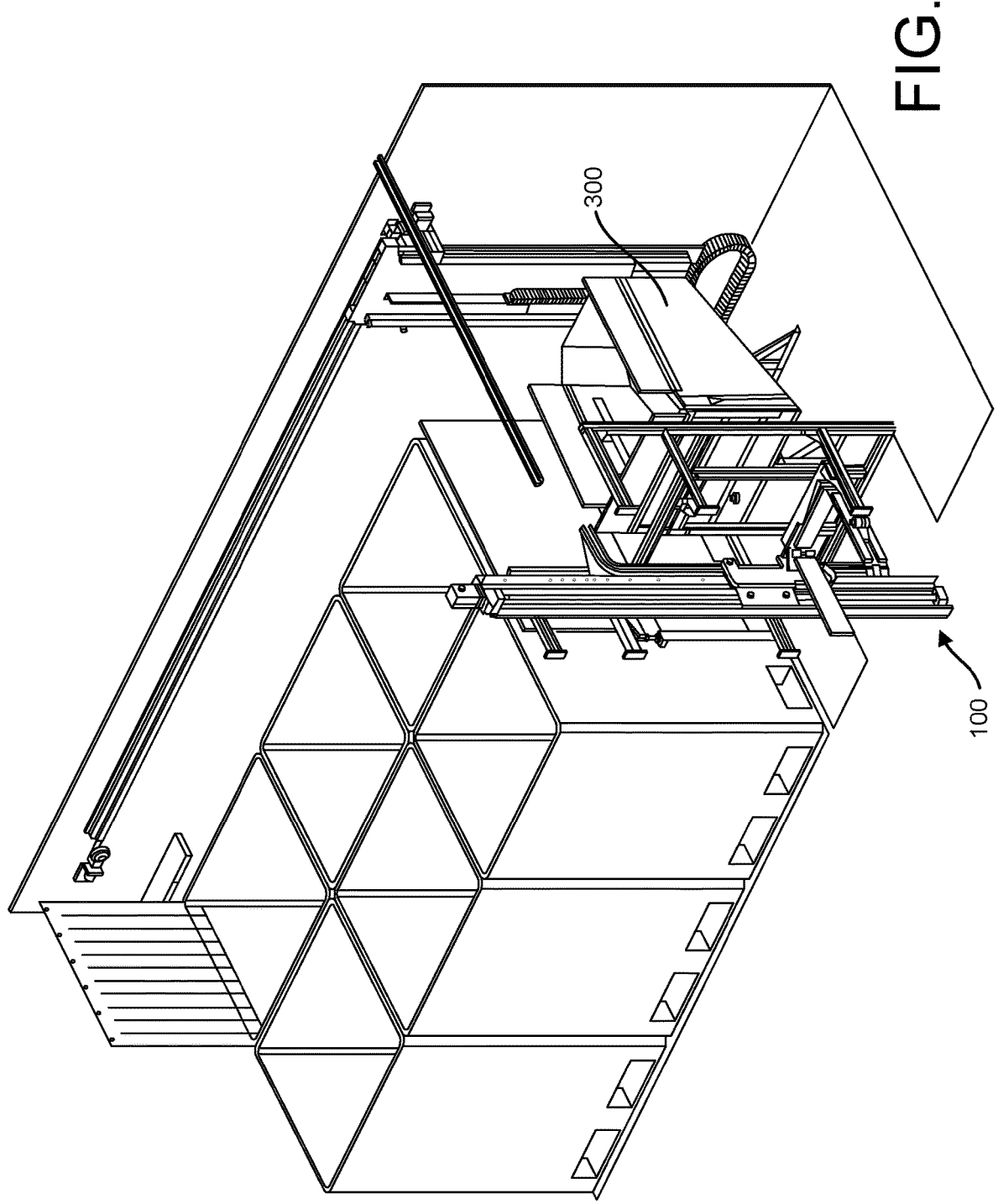
FIG. 20 illustrates the bin tipper of FIG. 1 installed in a side load collection vehicle.

Referring now to FIGS. 10-12 and 15-18, operation of the bin tipper 100 will be described. As seen in FIGS. 10 and 15, in operation of the bin tipper 100, the gripper assembly 9 is actuated such that the collection bin 14 is secured between the swivel arms 20 (Step 1). If the collection bin 14 has a lid, the collection bin 14 is oriented such that the lid opens in a direction extending away from the gripper weldment 15. As seen in FIGS. 11 and 16, once the collection bin 14 is secured, the lift carriage 3 and the gripper mount 13 translate vertically along the vertical support column 1. Simultaneously, the gripper mount 13 translates vertically along the proximal portion of the cam track 12, which is parallel to the vertical support column 1, via the cam follower 11 (Step 2). As seen in FIGS. 12 and 17, once the cam follower 11 enters the distal portion of the cam track 12, which is perpendicular to the vertical support column 1, the gripper mount 13 pivots about the stub shaft 10 and cam follower 11, thereby tilting the collection bin 14. While the cam follower 11 is moving along the distal portion of the cam track 12, the lift carriage 3 continues to translate vertically along the vertical support column 1 (Step 3). A height of the lift carriage 3 and a length of the gripper mount 13 limits a distance along the distal portion of the cam track 12 that the cam follower 11 is capable of reaching. As seen in FIGS. 13 and 18, as the lift carriage 3 continues to translate vertically along the support column 1, the gripper mount 13 continues to pivot about the stub shaft 10 and cam follower 11. Once the lift carriage 3 reaches a predetermined height, the gripper mount 13 has pivoted about the stub shaft 10 at an angle sufficient to invert the collection bin 14, thereby depositing the contents of the collection bin 14 in the desired location (Step 4). FIG. 18 illustrates the bin tipper 100 in the highest dump point with the bin tunnel 120 open. FIG. 19 shows the bin tipper 100 in travel mode with the bin tunnel 120 closed. In travel mode, an empty collection bin may be stored at the highest point. The empty collection bin may be exchanged for a full collection bin when an operator enters a customer's building to retrieve material to be collected and/or shredded. As seen in FIG. 21, for example, the vehicle may include a compartment that carries additional empty collection bins (e.g., two additional empty collection bins) for this purpose, or for dropping off empty bins at a customer's location. The bin tunnel 120 is closed while traveling to customer sites, and sometimes, while the operator is not at the collection vehicle (e.g., when the operator is inside a customer's building retrieving full collection bins).

By providing a support structure including the vertical support column 1 and the adjacent cam track 12, the bin tipper 100 differs from conventional bin tipper designs including a single cane with an arch at a distal end thereof. In particular, in the bin tipper 100, the arch has been eliminated. Elimination of the arch reduces the pulling force required to invert the collection bin 14 and allows for a reduction in the size of the bin tunnel 120, which houses the bin tipper 100. In addition, elimination of the arch allows for greater variety in design options for the shape and size of a hopper.

In a conventional bin tipper (see FIG. 24), the gripper carriage is pulled by a chain along a cane structure to lift and tip the collection bin. In order to invert the collection bin, the collection bin must be pulled over an arch at the distal end of the cane to eject material in a direction tangent to the arch. In contrast, the bin tipper 100 includes more mechanically efficient lead screw 5 and lead screw nuts 7 to raise and lower the gripper assembly/collection bin and a support structure comprised of a vertical support column 1 and adjacent cam track 12, along which two moving pivot points cause inversion of the collection bin to eject material with a pouring action. Elimination of the chain drive over the arch reduces the power required to lift and invert the collection bin and reduces the difference between the power requirement for gripping the collection bin and the power requirement for lifting the collection bin. Elimination of the cane structure also allows for a reduction in the size of the bin tunnel.

Other System Components

In some embodiments, the bin tipper 100 deposits material contained in a collection bin 14 into a hopper (e.g., the hopper 300). The hopper is configured to load the material into a desired location such as a shredder or a material-storage compartment. The hopper can be constructed in a conventional manner. The components and configuration thereof of a preferred hopper are described in U.S. Pat. No. 7,891,592 and U.S. Patent Application Publication No. 2013/0259614, the entire contents of which are hereby incorporated herein by reference.

In other embodiments, the bin tipper 100 deposits material contained in a collection bin 14 into a shredder configured to shred the material into a smaller size. The shredder may include a shredder of any suitable type, such as a ST-15 shear shredder, a ST-25 shear shredder, a ST-35 shear shredder, a high speed hammermill, a single rotor shredder, a shredder including at least two counter rotating shafts, or any combination thereof. The shredder can be constructed in a conventional manner. The components and configuration thereof of a preferred shredder are described in U.S. Pat. Nos. 7,891,592, 8,517,294, U.S. Patent Application Publication No. 2006/0219826, and U.S. Patent Application Publication No. 2014/0166789, the entire contents of which are hereby incorporated herein by reference.

In other embodiments, the bin tipper 100 deposits material contained in a collection bin 14 into a material-storage compartment configured to receive and hold the material. In some embodiments, the material-storage compartment may be a single, large receptacle or the truck box itself (e.g., the material can be deposited on the floor of the truck box). A hopper could be used to distribute the material within the single receptacle. See FIGS. 22 and 23. In other embodiments, the material-storage compartment can be configured or to receive and hold a plurality of containers, which have been loaded into the material-storage compartment, and which themselves are configured to receive and hold the material. The components and configuration thereof of a preferred material-storage compartment are described in U.S. Patent Application Publication No. 2013/0259614, the entire contents of which are hereby incorporated herein by reference.

The bin tipper 100 may be provided in a motor vehicle. Preferably the motor vehicle is a truck. However, other types of motor vehicles could be used. Moreover, the bin tipper 100 could find advantageous use in circumstances that do not involve the use of a motor vehicle. In embodiments in which the bin tipper is provided in a motor vehicle, the motor vehicle may be a side load collection truck or a rear load collection truck. This configuration allows the motor vehicle to accommodate facilities in which loading docks are used for loading materials. In a preferred embodiment, the motor vehicle is used to transport the deposited material to a facility, such as a recycling or destruction facility.

The motor vehicle can include a control system having at least one set of controls that can be manipulated by an operator to control the bin tipper. In some embodiments, the motor vehicle may include two sets of controls for ground level and dock level control. This configuration allows an operator to safely and easily operate the bin tipper while standing at either ground level or dock level. The control system may be any known computing system but is preferably a programmable, processor-based system. The control system can include a microprocessor having a permanent memory for storing software for the operation and monitoring of the bin tipper and a reprogrammable memory for storing storage data and system variables. For example, the control system may include a microprocessor, a hard drive, solid state memory, random access memory (RAM), read only memory (ROM), input/output (I/O) circuitry, and any other well-known computer component. The software can comprise the procedures, algorithms and all other operation parameters and protocols for controlling the individual components of the bin tipper. Almost any microprocessor could execute the algorithms, and the software language could be assembly code, C, C#, BASIC, or the like. The motor vehicle may also include cameras to enable operators to monitor loading and sorting operations.

In one embodiment, the bin tipper is driven using traditional hydraulic technology through a power take-off (PTO) mounted on the truck transmission, a technique typical of the industry. In another embodiment, the bin tipper could be powered using electrical power as outlined in U.S. Pat. No. 8,517,294, the entire contents of which is hereby incorporated by reference. Using electrical power provides advantages such as reduced fuel usage and impact on the environment, use of a high percentage of grid energy for operation, operation without the engine idling, and the ability to operate inside buildings without the concern of releasing toxins in the air.

Alternatively, since the overall power requirements of the bin tipper are very low, a small auxiliary engine power unit, either electric or hydraulic, could be used for power. This would allow for segregation of fuel usage.

One versed in the art would appreciate that there may be other embodiments and modifications within the scope and spirit of the disclosure. Accordingly, all modifications attainable by one versed in the art from the present disclosure, within its scope and spirit, are to be included as further embodiments of the present disclosure.

What is claimed:

1. A bin tipper configured to lift and invert a collection bin to deposit contents of the collection bin into a desired location, the bin tipper comprising:
   a vertical support column;
   a cam track adjacent to the vertical support column, the cam track including a proximal portion parallel to the vertical support column and a distal portion provided at an angle with respect to the vertical support column;
   a structural member mounted to the vertical support column and configured to translate along the vertical support column; and
   a gripper assembly including:
      a gripper mount wherein a first end of the gripper mount is pivotally mounted to the structural member and a second end of the gripper mount includes a cam follower extending therefrom, the cam follower configured to move within the proximal portion and the distal portion of the cam track;
      a gripper weldment attached to the gripper mount;
      a first gripper arm mounted to the gripper weldment via a first pivot;
      a first swivel arm mounted to the first gripper arm via a first ball joint;
      a second gripper arm mounted to the gripper weldment via a second pivot; and
      a second swivel arm mounted to the second gripper arm via a second ball joint, wherein the first swivel arm and the second swivel arm are configured to receive the collection bin therebetween.

2. The bin tipper of claim 1, wherein:
the vertical support column comprises parallel guide rails, and
the structural member is mounted to the parallel guide rails and configured to translate along the parallel guide rails.

3. The bin tipper of claim 2, further comprising a plurality of guide bearing blocks, the structural member and the plurality of guide bearing blocks together comprising a lift carriage, wherein:
each of the parallel guide rails is received in at least one of the plurality of guide bearing blocks,
the structural member is mounted to the parallel guide rails via the plurality of guide bearing blocks, and
the guide bearing blocks are configured to translate along the parallel guide rails, thereby translating the structural member along the vertical support column.

4. The bin tipper of claim 3, further comprising:
a lead screw anchored in a first end bearing block at a top portion of the vertical support column at a first end thereof, and anchored in a second end bearing block at a bottom portion of the vertical support column at a second end thereof;
at least one lead screw nut anchored to the lift carriage and configured to interface with the lead screw; and
a drive motor configured to drive the lead screw to translate the lift carriage along the vertical support column.

5. The bin tipper of claim 1, wherein the bin tipper does not include a chain.

6. The bin tipper of claim 1, wherein a maximum width of the structural member is equal to a width of the vertical support column such that the structural member does not overlap with the cam track.

7. The bin tipper of claim 1, wherein the distal portion of the cam track is provided at a perpendicular angle with respect to the vertical support column.

8. The bin tipper of claim 1, wherein:
the gripper mount is pivotally mounted to the structural member via a stub shaft, and
when the cam follower is located within the proximal portion of the cam track, the cam follower is provided at a height greater than a height at which the stub shaft is provided.

9. The bin tipper of claim 1, wherein as the cam follower moves along the distal portion of the cam track in a direction extending away from the vertical support column, the gripper mount is configured to pivot with respect to the structural member to invert the collection bin.

10. The bin tipper of claim 1, wherein the gripper assembly further comprises a support platform configured to support a bottom of the collection bin, the support platform being attached to the gripper weldment.

11. The bin tipper of claim 10, wherein the gripper assembly further comprises:
a linear actuator configured to extent and retract to reversibly and repeatedly move the second gripper arm inwards or outwards; and
a link arm pivotally connected to the first gripper arm and the second gripper arm, the link arm being configured to move the first gripper arm in an opposite rotational direction than the second gripper arm.

12. The bin tipper of claim 1, wherein the first swivel arm and the second swivel arm include at least one palm grip, finger grip, or a combination thereof configured to assist in gripping the collection bin.

13. The bin tipper of claim 1, the gripper assembly further comprises:
a first bumper provided on the first gripper arm; and
a second bumper provided on the second gripper arm,
wherein the first bumper and the second bumper are configured to limit an opening between the first swivel arm and the second swivel arm.

14. A motor vehicle comprising:
the bin tipper of claim 1; and
a bin tunnel configured to house the bin tipper.

15. The motor vehicle of claim 14, wherein the bin tipper is configured to engage with the collection bin at a side of the motor vehicle.

16. The motor vehicle of claim 14, wherein the bin tipper is configured to engage with the collection bin at a rear of the motor vehicle.

17. The motor vehicle of claim 14, further comprising a hopper, wherein:
the bin tipper is configured to deposit the contents of the collection bin into the hopper, and
the hopper is configured to deposit the material into a desired location within the motor vehicle.

18. A method of using a bin tipper to invert a collection bin and deposit contents of the collection bin into a desired location, the bin tipper including a vertical support column and a cam track adjacent to the vertical support column, the cam track including a proximal portion parallel to the vertical support column and a distal portion provided at an angle with respect to the vertical support column, the method comprising:
receiving the collection bin within a gripper assembly including:
a gripper mount having gripper arms mounted thereon, wherein a first end of the gripper mount is pivotally mounted to a structural member mounted to the vertical support column and a second end of the gripper mount includes a cam follower extending therefrom, the cam follower configured to move within the proximal portion and the distal portion of the cam track;
a gripper weldment attached to the gripper mount;
a first gripper arm mounted to the gripper weldment via a first pivot;
a first swivel arm mounted to the first gripper arm via a first ball joint;
a second gripper arm mounted to the gripper weldment via a second pivot; and
a second swivel arm mounted to the second gripper arm via a second ball joint, wherein the first swivel arm and the second swivel arm are configured to receive the collection bin therebetween;
lifting the collection bin by translating the gripper assembly upwards along the vertical support column and the proximal portion of the cam track, the cam follower being located within the proximal portion of the cam track; and
inverting the collection bin by pivoting the gripper mount with respect to the structural member and moving the cam follower along the distal portion of the cam track in a direction extending away from the vertical support column.

* * * * *